(12) United States Patent
Motohashi et al.

(10) Patent No.: US 11,594,790 B2
(45) Date of Patent: Feb. 28, 2023

(54) METHOD OF MANUFACTURING BATTERY PACK AND BATTERY PACK

(71) Applicant: Marelli Corporation, Saitama (JP)

(72) Inventors: Toshiyuki Motohashi, Saitama (JP); Takayuki Hirase, Saitama (JP)

(73) Assignee: Marelli Corporation, Saitama (JP)

( * ) Notice: Subject to any disclaimer, the term of this patent is extended or adjusted under 35 U.S.C. 154(b) by 235 days.

(21) Appl. No.: 16/753,520

(22) PCT Filed: Oct. 2, 2018

(86) PCT No.: PCT/JP2018/036927
§ 371 (c)(1),
(2) Date: Apr. 3, 2020

(87) PCT Pub. No.: WO2019/069944
PCT Pub. Date: Apr. 11, 2019

(65) Prior Publication Data
US 2020/0259158 A1 Aug. 13, 2020

(30) Foreign Application Priority Data

Oct. 3, 2017 (JP) .............................. JP2017-193809

(51) Int. Cl.
*H01M 50/54* (2021.01)
*H01M 50/536* (2021.01)
(Continued)

(52) U.S. Cl.
CPC ......... *H01M 50/54* (2021.01); *H01M 50/536* (2021.01); *H01M 50/211* (2021.01); *H01M 50/534* (2021.01)

(58) Field of Classification Search
CPC ..... H01M 50/20; H01M 10/54; H01M 50/211
See application file for complete search history.

(56) References Cited

U.S. PATENT DOCUMENTS

| 2012/0141847 A1 | 6/2012 | Amagai et al. |
| 2016/0248068 A1 | 8/2016 | Ha |

(Continued)

FOREIGN PATENT DOCUMENTS

| JP | 2011171114 A | 9/2011 |
| JP | 4877373 B2 | 2/2012 |

(Continued)

OTHER PUBLICATIONS

International Preliminary Report on Patentability dated Apr. 8, 2020 of International Application No. PCT/JP2018/036927.

(Continued)

*Primary Examiner* — Maria Laios
*Assistant Examiner* — Jordan E Berresford
(74) *Attorney, Agent, or Firm* — Young Basile Hanlon & MacFarlane, P.C.

(57) ABSTRACT

A method of manufacturing a battery pack including battery cells that have electrode tabs protruding from an outer surface includes stacking the battery cells and housing the battery cells in a case so that the electrode tabs protrude from slits in the case, bending the electrode tabs protruding from the slits so that the electrode tabs of adjacent battery cells are folded and overlap each other, and welding the folded and overlapping portion of the electrode tabs.

13 Claims, 22 Drawing Sheets

(51) Int. Cl.
*H01M 50/534* (2021.01)
*H01M 50/211* (2021.01)

(56) References Cited

U.S. PATENT DOCUMENTS

2017/0365838 A1* 12/2017 Okada ................. H01M 50/543
2018/0309110 A1   10/2018 Iwasaki et al.

FOREIGN PATENT DOCUMENTS

| JP | 2016157670 A |   | 9/2016 | |
|----|--------------|---|--------|---|
| KR | 20150055255 A | * | 5/2015 | ............. Y02E 60/10 |
| KR | 102271383 B1 | * | 8/2017 | ........... B23K 1/0016 |
| WO | 2017068703 A1 |   | 4/2017 | |

OTHER PUBLICATIONS

Office Action of corresponding application JP2017-193809; dated Dec. 4, 2018; 3 pages.
Office Action of corresponding application JP2017-193809; dated Apr. 2, 2019; 3 pages.

* cited by examiner

METHOD OF MANUFACTURING BATTERY PACK AND BATTERY PACK

CROSS-REFERENCE TO RELATED APPLICATION

The present application is a 371 application of International Patent Application Serial No. PCT/JP2018/036927, filed Oct. 2, 2018, which claims priority to and the benefit of Japanese Patent Application No. 2017-193809 filed Oct. 3, 2017, the entire contents of which are incorporated herein by reference.

TECHNICAL FIELD

The present disclosure relates to a method of manufacturing a battery pack and to a battery pack.

BACKGROUND

A chargeable/dischargeable battery module that includes a plurality of battery cells is known. For example, patent literature JP4877373B2 discloses stacking battery cells and joining the positive electrode tab and negative electrode tab of each battery cell to a bus bar by ultrasonic welding or the like.

SUMMARY

To prevent the tabs of each layer from interfering during ultrasonic welding when the tabs of the stacked battery cells are welded to the bus bar in JP4877373B2, the tabs are trimmed so as not to overlap in plan view. If the tabs of the battery cell are trimmed, however, then current collects at the remaining tip of the tab, increasing heat generation and possibly leading to shorter cell life.

In light of these considerations, the present disclosure aims to provide a method of manufacturing a battery pack and a battery pack that enable welding without trimming the tabs of battery cells.

To resolve the aforementioned problem, a method according to an embodiment of the present disclosure is a method of manufacturing a battery pack including a plurality of battery cells that have electrode tabs protruding from an outer surface, the method including:

stacking the plurality of battery cells and housing the plurality of battery cells in a case so that the electrode tabs protrude from slits in the case;

bending the electrode tabs protruding from the slits so that electrode tabs of adjacent battery cells are folded and overlap each other; and welding a folded and overlapping portion of the electrode tabs.

A battery pack according to an embodiment of the present disclosure includes:

a plurality of battery cells having electrode tabs protruding from an outer surface; and a case housing the plurality of battery cells in a stacked state;

wherein the case includes a plurality of slits through which the electrode tabs protrude;

wherein the electrode tabs of adjacent battery cells are bent so that portions protruding from the slits are folded and overlap each other; and wherein a folded and overlapping portion of the electrode tabs is welded outside the case.

The method of manufacturing a battery pack and the battery pack according to embodiments of the present disclosure enable welding without trimming the tabs of battery cells.

DETAILED DESCRIPTION

Embodiments of the present disclosure are described below with reference to the attached drawings. The front-back, left-right, and up-down directions in the description below take the directions of the arrows in the figures as a reference. The stacking direction of the plurality of battery cells 10 in the example below is the up-down direction, but this example is not limiting. The stacking direction of the plurality of battery cells 10 may match any other direction.

First Embodiment

Figure 1:
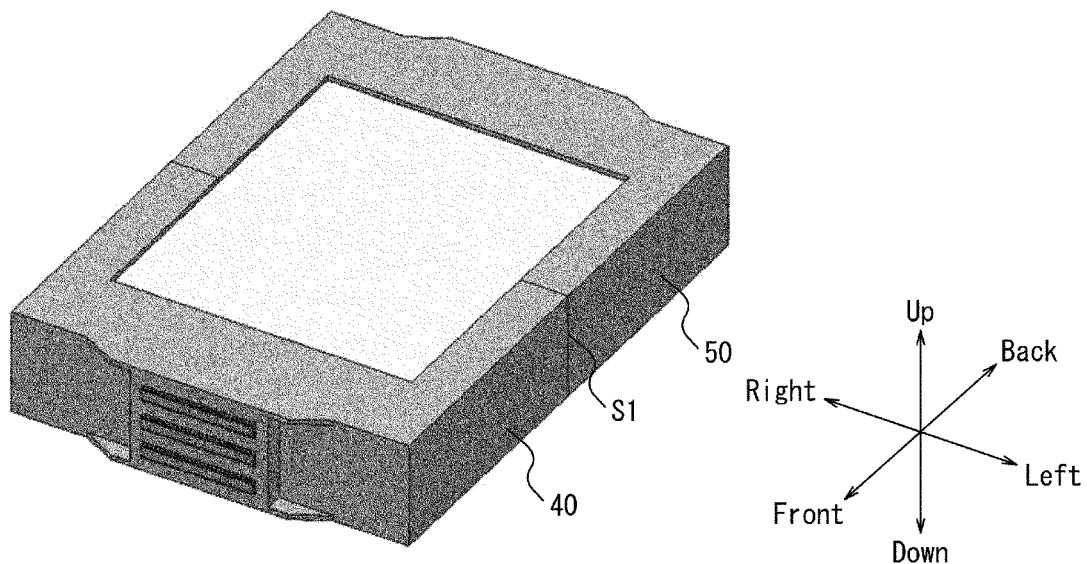
FIG. 1 is a perspective view illustrating the appearance of a battery pack according to a first embodiment of the present disclosure.
Figure 2:
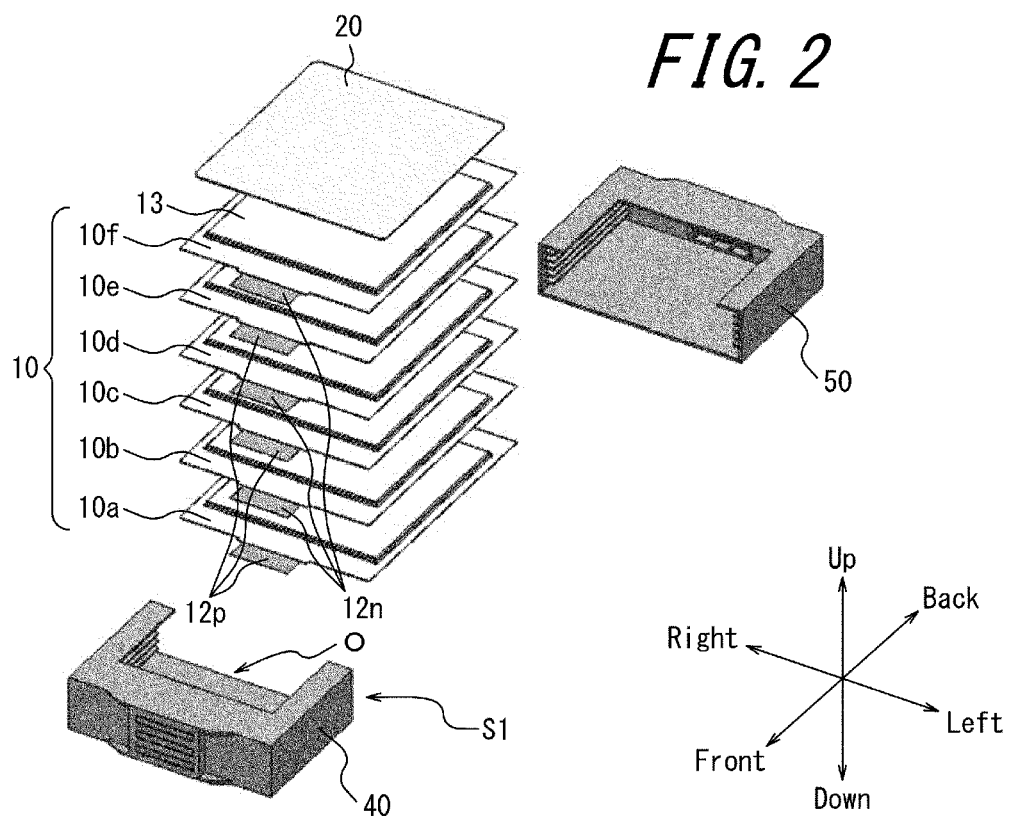
FIG. 2 is an exploded perspective view of each component inside the battery pack in FIG. 1.

FIG. 1 is a perspective view illustrating the appearance of a battery pack 1 according to a first embodiment of the present disclosure. FIG. 2 is an exploded perspective view of each component inside the battery pack 1 illustrated in FIG. 1. The battery pack 1 includes six battery cells 10, an insulating sheet 20, a first case 40, and a second case 50 as major constituent elements.

The six battery cells 10 are stacked in the up-down direction. The six stacked battery cells 10 are referred to below as the battery cells 10a, 10b, 10c, 10d, 10e, 10f in order from bottom to top. The battery cells are referred to collectively as battery cells 10 when no distinction therebetween is made. Each battery cell 10 has two outer surfaces 11 formed by a front surface and a back surface that are substantially parallel in the up-down direction. Each battery cell 10 has one pair of electrode tabs 12p and 12n that protrude in opposite directions from the two outer surfaces 11 in a direction substantially perpendicular to the stacking direction, in particular in the front-back direction. Each battery cell 10 is stacked with the pair of electrode tabs 12p and 12n aligned in the front-back direction.

The insulating sheet 20 is formed as a substantially flat plate by an electrically insulating material such as polyethylene (PE) or polypropylene (PP) resin. The insulating sheet 20 is disposed to abut against the upper surface of the battery cell 10f positioned at the top of the stacked battery cells 10. The insulating sheet 20 is provided to secure electrical insulation between the restraining plate 30 abutting against the upper surface of the battery pack 1 and the battery cells 10 inside the battery pack 1.

A restraining plate 30 is disposed to abut against the upper surface of the insulating sheet 20. The restraining plate 30 is fixed to the upper surfaces of the engaged first case 40 and second case 50 by a suitable method, such as screwing. For example, the restraining plate 30 is fixed to the top of the engaged first case 40 and second case 50 by screwing screws into hole portions provided at the four corners of the restraining plate 30 and aligned with two screw holes provided at the left and right front edges of the first case 40 and two screw holes provided at the left and right back edges of the second case 50. The restraining plate 30 clamps the battery cells 10 to the first case 40 and the second case 50 in a state that restrains outer surfaces 13 that are formed by the upper and lower surfaces of the battery cells 10 and that are perpendicular to the stacking direction. At the same time, the restraining plate 30 supports the battery cells 10.

The first case 40 and the second case 50 engage with each other to support the stacked battery cells 10 therein. In other words, the stacked battery cells 10 are mounted on a bottom surface 40a of the first case 40 and a bottom surface 50a of the second case 50. When engaged, the first case 40 and the second case 50 have an opening O formed on the top surface opposite the bottom surface. Connection surfaces S1 of the first case 40 and the second case 50 that are connected to each other are substantially parallel to the outer surfaces 11 of the battery cells 10 on the electrode tab 12p or 12n side. In other words, the connection surfaces S1 are parallel to the up-down direction. In this way, the first case 40 and the second case 50 engage or separate in the protruding direction of the electrode tabs 12p and 12n of the battery cells 10.

Among the stacked battery cells 10, adjacent battery cells 10 may be adhesively fixed to each other by an adhesive such as a bonding agent or double-sided tape. For example, adjacent battery cells 10 may be adhesively fixed to each other by any method, such as applying a bonding agent to the upper surface of each battery cell 10. Similarly, the battery cell 10f and the insulating sheet 20 may be adhesively fixed to each other by adhesive. Furthermore, the insulating sheet 20 and restraining plate 30 may similarly be adhesively fixed to each other by adhesive.

Figure 3A:
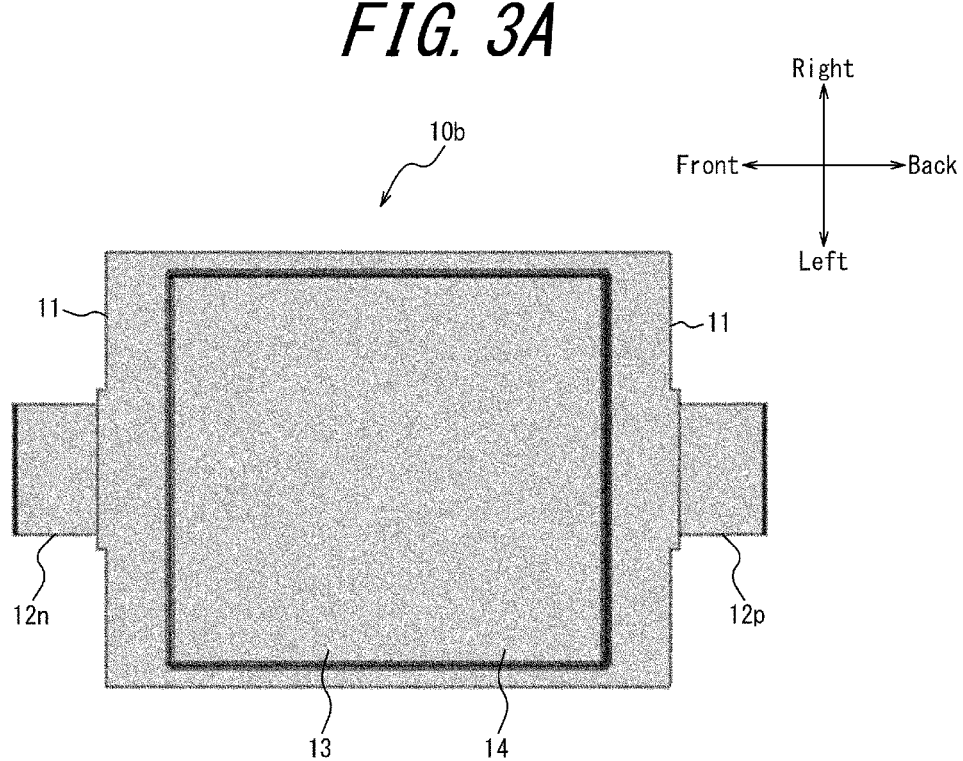
FIG. 3A is a top view of only the battery cell of FIG. 2.
Figure 3B:
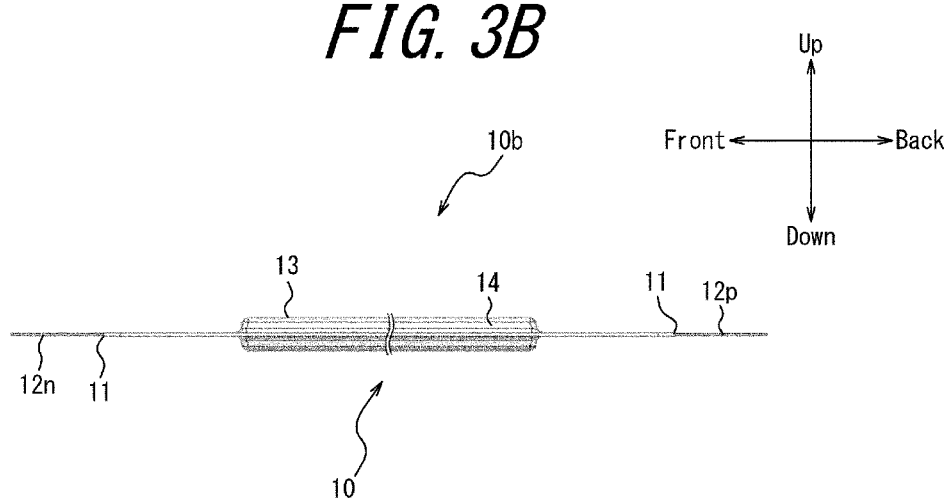
FIG. 3B is a side view of only the battery cell of FIG. 2.

FIGS. 3A and 3B illustrate only the battery cell 10 of FIG. 2. FIG. 3A is a top view of the battery cell 10. FIG. 3B is a side view of the battery cell 10. As an example, FIGS. 3A and 3B illustrate the battery cell 10b disposed as in FIG. 2. The other battery cells 10 are also configured similarly to the battery cell 10b illustrated in FIGS. 3A and 3B.

The battery cell 10 is formed as a substantially flat plate when viewed from the top. An exterior member 14 of the battery cell 10 is formed by a laminated film. The outermost layer of the exterior member 14 is made of resin to secure electrical insulation. The upper and lower surfaces of the exterior member 14 form the outer surfaces 13. The outer surfaces 11 protrude one step farther outward in the central region than at the left and right edges. In other words, the outer surfaces 11 are formed to be convex when viewed from the top. The electrode tab 12p or 12n protrudes from the portion of the outer surface 11 that protrudes one step outward. The electrode tabs 12p and 12n normally protrude as a flat plate but protrude towards the outside in opposite directions in order to contact the electrode tab of another battery cell 10 and the like adjacent in the up-down direction. For example, the electrode tab 12p protrudes linearly outward along the front-back direction. The electrode tab 12n protrudes linearly outward along the front-back direction. In the example below, the electrode tab 12p protruding backward is a positive electrode terminal, and the electrode tab 12n protruding forward is a negative electrode terminal, but this example is not limiting. The electrode tabs 12p and 12n may be configured so that the positive electrode and negative electrode roles are reversed.

Figure 4A:
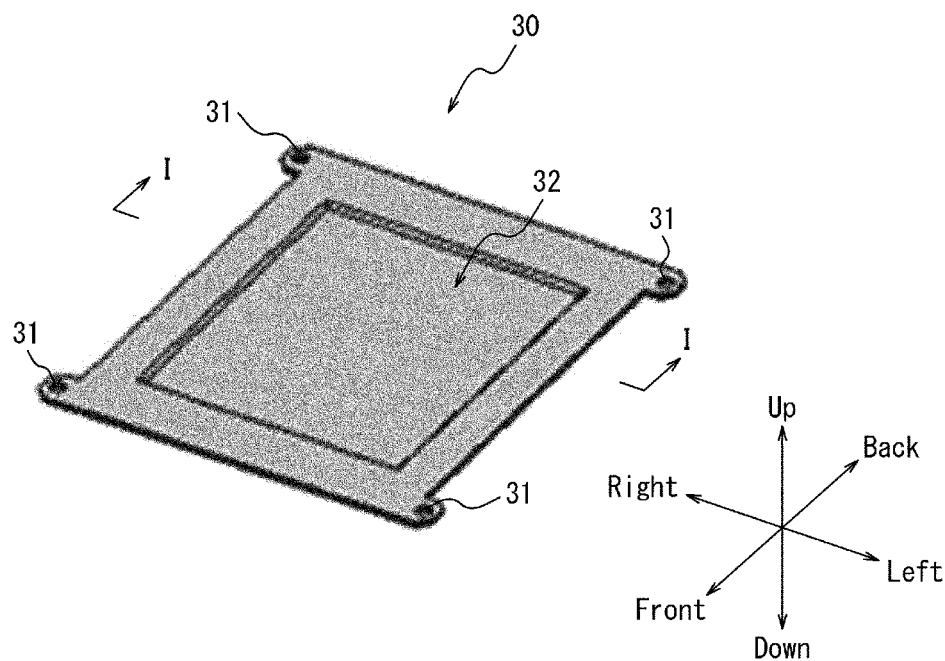
FIG. 4A is a perspective view, from the top, of only the restraining plate of FIG. 2.
Figure 4B:
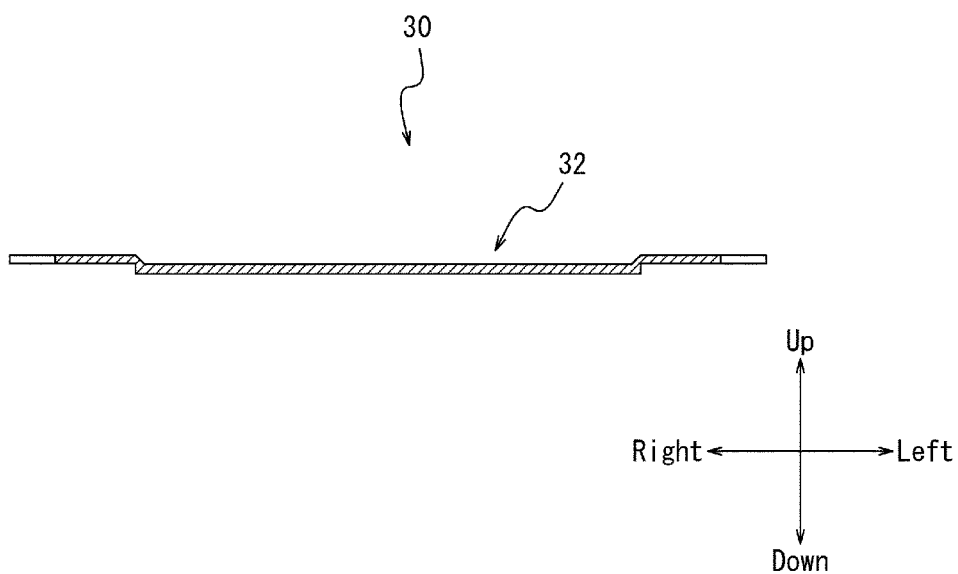
FIG. 4B is a cross-sectional view along the I-I line of FIG. 4A.

FIGS. 4A and 4B illustrate only the restraining plate 30 of FIG. 2. FIG. 4A is a perspective view, from the top, of the restraining plate 30. FIG. 4B is a cross-sectional view along the I-I line of FIG. 4A.

The restraining plate 30 is suitably made of any highly rigid material. For example, the restraining plate 30 is suitably made exclusively of a metal material. This example is not limiting, and the restraining plate 30 may be made of a resin material or a metal material provided with an electrically insulating material, such as PET resin, on the surface thereof. The restraining plate 30 is formed as a substantially flat plate. The restraining plate 30 has a substantially rectangular recess 32 formed at the substantially central region and recessed one step inward along the up-down direction. Four hole portions 31 protrude from the four corners of the outer edge of the restraining plate 30 that surrounds the recess 32. The surface of the recess 32 is, for example, formed linearly to be substantially parallel to the surface of the outer edge of the restraining plate 30. The surface of the recess 32 is not limited to this configuration and may, for example, be formed as a linear or curved surface that is inclined to protrude farther inward towards the central region thereof. The battery pack 1 can firmly fix the battery cells 10 therein by pressure from the recess 32. The restraining plate 30 is not limited to a configuration such as the recess 32. For example, the recess 32 may be omitted, and the restraining plate 30 may be formed so that the surface thereof is a linear or curved surface inclined to protrude gradually inward from the outer edge towards the central region thereof. Instead of the recess 32, the restraining plate 30 may have at least one rib that protrudes from the lower surface in the central region, for example.

Figure 5A:
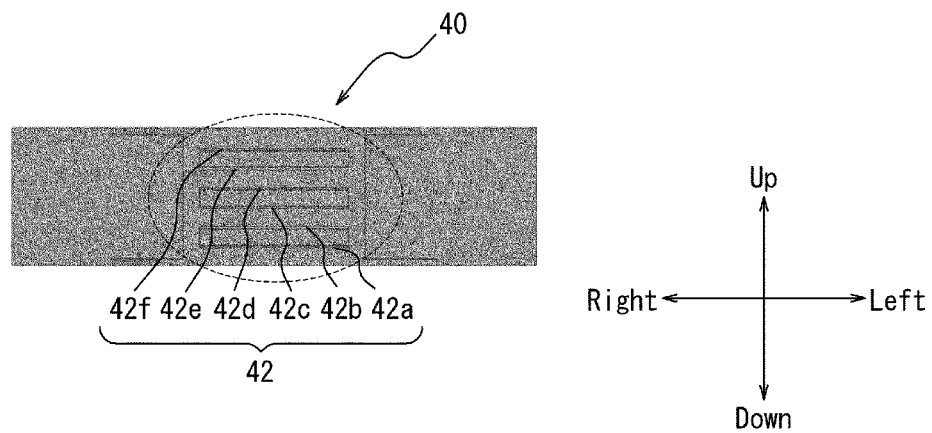
FIG. 5A illustrates the front surface of the first case in FIG. 2.
Figure 5B:
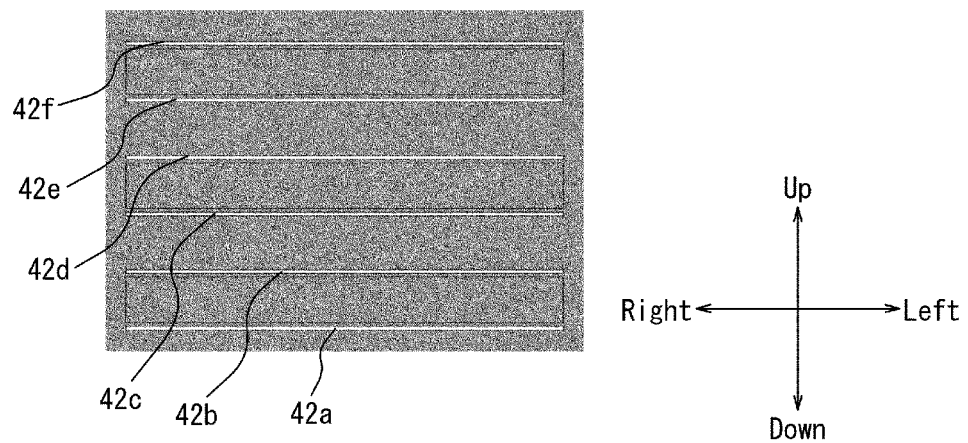
FIG. 5B illustrates an enlargement of a portion of the front surface of the first case in FIG. 2.

FIG. 5A illustrates the front surface of the first case 40 in FIG. 2. FIG. 5B illustrates an enlargement of a portion of the front surface of the first case 40.

The first case 40 is made of a resin material or a metal material provided with an electrically insulating material, such as PET resin, on the surface thereof. The first case 40 may be made of any highly rigid material. The central region on the front surface of the first case 40 is formed to protrude one step outward. Six substantially rectangular slits 42 that pass through the front surface extend in the left-right direction in the central region of the front surface. The slits 42 are formed to allow the electrode tabs 12p and 12n of the battery cell 10 to protrude through the slits 42. The six slits 42 are arranged in a line in the up-down direction so that the positions of the left and right ends are aligned.

Like the first case 40, the second case 50 is made of a resin material or a metal material provided with an electrically insulating material, such as PET resin, on the surface thereof. The second case 50 may be made of any highly rigid material. The second case 50 is preferably made of the same material as the first case 40 with which the second case 50 engages. The central region on the back surface of the second case 50 is formed to protrude one step outward. Six substantially rectangular slits 52 that pass through the back surface extend in the left-right direction in the central region of the back surface. The slits 52 are formed to allow the electrode tabs 12p and 12n of the battery cell 10 to protrude through the slits 52. The six slits 52 are arranged in a line in the up-down direction so that the positions of the left and right ends are aligned.

FIGS. 6A through 6D are schematic diagrams respectively illustrating representative first through fourth steps for assembling the battery pack 1. FIGS. 7A and 7B are schematic diagrams illustrating the inside of the first case 40 and the second case 50 at the time of the third and fourth steps of FIGS. 6C and 6D. FIG. 7A illustrates an enlargement of a portion in a cross-section of the central region on the front surface of the first case 40. FIG. 7B illustrates an enlargement of a portion in a cross-section of the central region on the back surface of the second case 50.

Figure 6A:
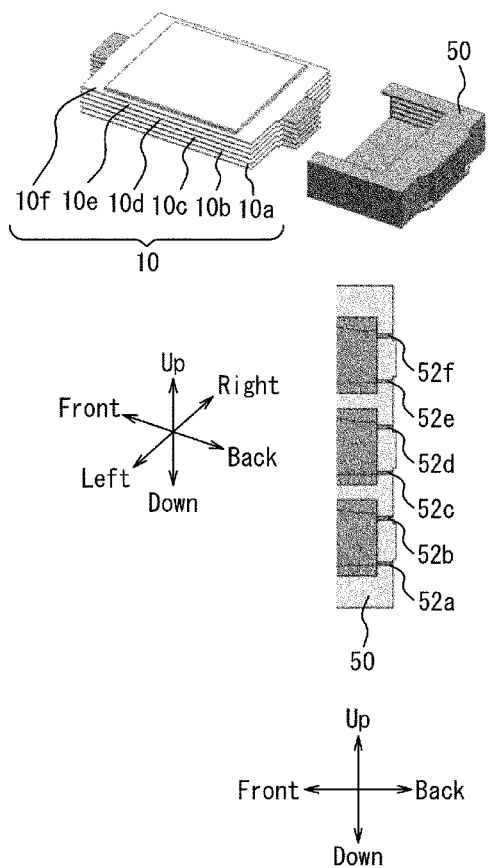
FIG. 6A is a schematic diagram illustrating a first step for assembling a battery pack.
Figure 6B:
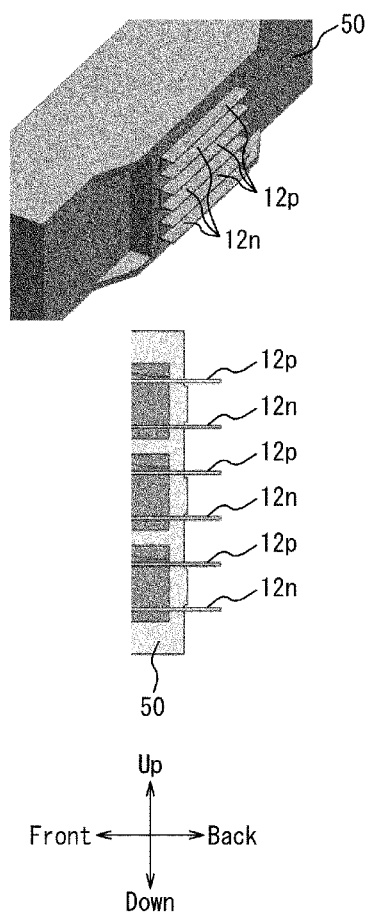
FIG. 6B is a schematic diagram illustrating a second step for assembling a battery pack.
Figure 6C:
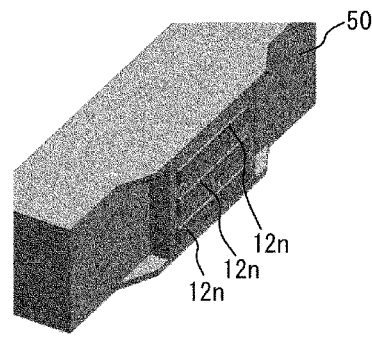
FIG. 6C is a schematic diagram illustrating a third step for assembling a battery pack.
Figure 6C:
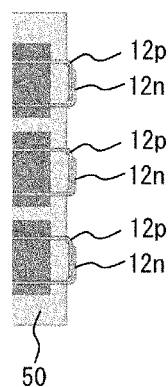
Figure 7A:
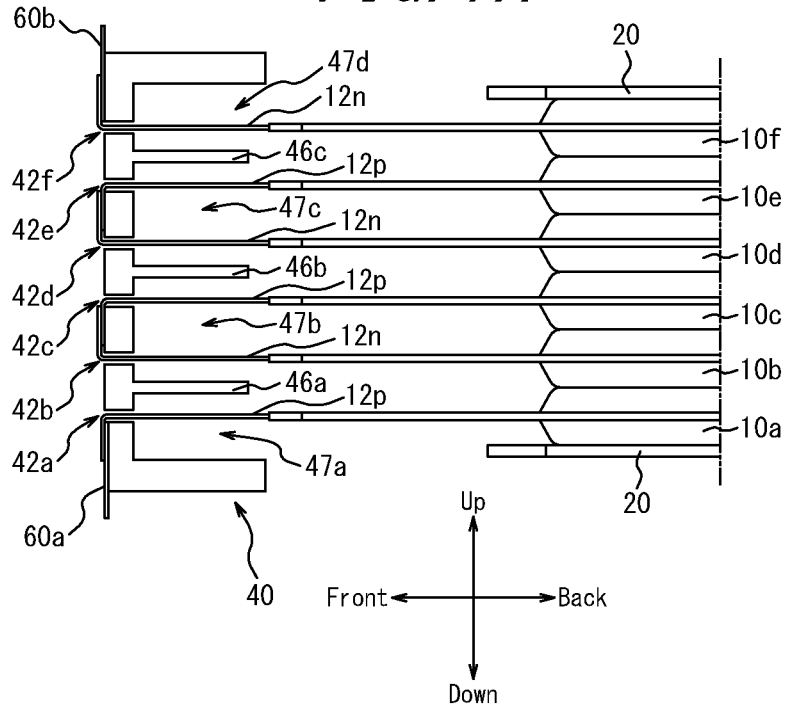
FIG. 7A is a schematic diagram illustrating the inside of the first case at the time of the third step and the fourth step of FIG. 6C and FIG. 6D.
Figure 7B:
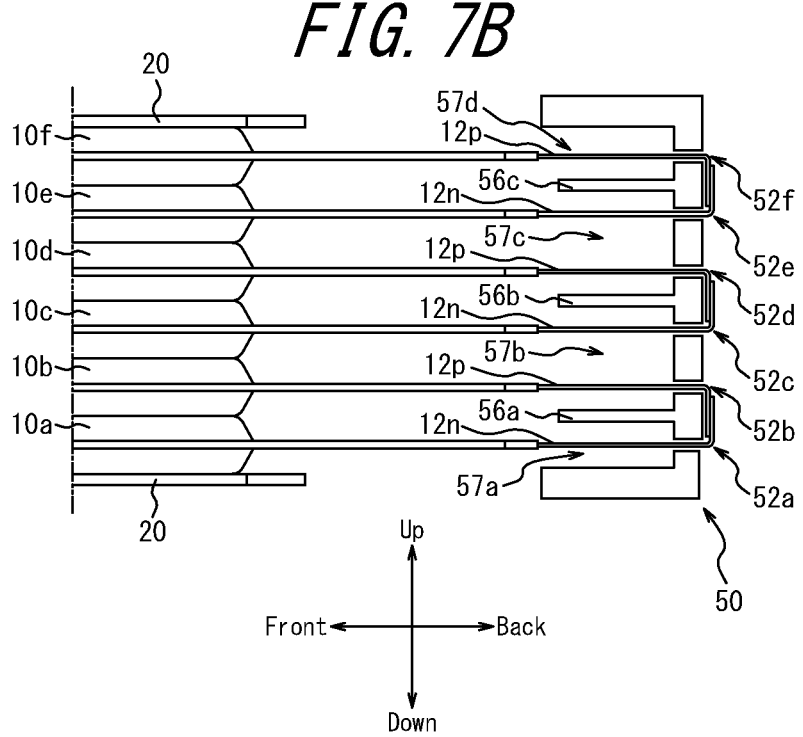
FIG. 7B is a schematic diagram illustrating the inside of the second case at the time of the third step and the fourth step of FIG. 6C and FIG. 6D.

In the first step illustrated in FIG. 6A, the six stacked battery cells 10 are inserted in the second case 50. In this state, the first case 40 is fitted onto the second case 50, which is holding the battery cells 10 and the insulating sheet 20, from the front. In the second step illustrated in FIG. 6B, the electrode tabs 12p and 12n of the battery cells 10 are caused to protrude from the slits 42 of the first case 40 and the slits 52 of the second case 50. In the third step illustrated in FIG. 6C, the electrode tabs 12p and 12n protruding from the slits 42 of the first case 40 and the slits 52 of the second case 50 are bent so that the electrode tabs of adjacent battery cells 10 are folded and overlap each other.

Figure 6D:
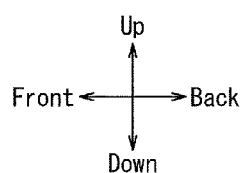
FIG. 6D is a schematic diagram illustrating a fourth step for assembling a battery pack.
Figure 6D:
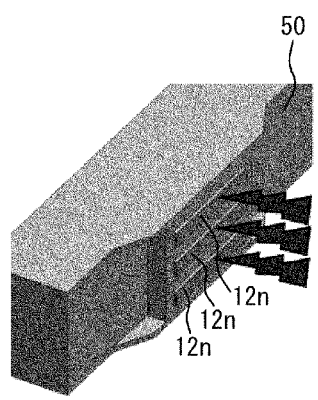

In the fourth step illustrated in FIG. 6D, a laser for welding irradiates the folded and overlapping portion of the electrode tabs 12p and 12n, which are the welding spots, to weld the electrode tabs 12p and 12n together. Similarly, the electrode tab 12p and a total plus bus bar 60a are welded together, and the electrode tab 12n and a total minus bus bar 60b are welded together.

The restraining plate 30 is fixed to the upper surfaces of the engaged first case 40 and second case 50 by a suitable method, such as screwing, after the fourth step illustrated in FIG. 6D. This completes the assembly of the battery pack 1.

As illustrated in FIG. 7A, the first case 40 includes four housing portions 47a to 47d. The back portion of the front central region of the first case 40 is divided in the up-down direction into the four housing portions 47a to 47d by three insulating portions 46a to 46c. The electrode tab 12p of the battery cell 10a is disposed in the housing portion 47a. The electrode tab 12n of the battery cell 10b adjacent to the upper portion of the battery cell 10a is disposed in the housing portion 47b. Similarly, the electrode tab 12p of the battery cell 10c adjacent to the upper portion of the battery cell 10b is disposed in the housing portion 47b. The electrode tabs 12p and 12n at the front of the battery cells 10d, 10e, and 10f are similarly arranged alternately in the housing portions 47c and 47d. Consequently, one, two, two, and one electrode tabs are respectively housed in the four housing portions 47 of the first case 40 from bottom to top, with the electrode tabs 12p and 12n being arranged alternately.

The electrode tab 12p of the battery cell 10a protrudes outside the first case 40 through the slit 42a and is bent by the third step so as to overlap the total plus bus bar 60*a*. In other words, the electrode tab 12*p* of the battery cell 10*a* protrudes from the slit 42*a*, bends downwards at approximately 90 degrees, and abuts against the total plus bus bar 60*a* near the slit 42*a*. The laser for welding is irradiated onto the abutting portion, and the electrode tab 12*p* and the total plus bus bar 60*a* are welded together.

The electrode tabs 12*p* and 12*n* of the battery cells 10*b* to 10*e* protrude outside the first case 40 through the slits 42*b* to 42*e* and are bent by the third step so as to be folded and overlapping each other. Specifically, the electrode tab 12*p* protrudes from the slit 42, bends downwards at approximately 90 degrees, and abuts against the electrode tab 12*n* of the downwardly adjacent battery cell 10 near the slit 42. The electrode tab 12*n* protrudes from the slit 42, bends upwards at approximately 90 degrees, and abuts against the electrode tab 12*p* of the upwardly adjacent battery cell 10 near the slit 42. The laser for welding is irradiated onto the abutting portion, and the electrode tabs 12*p* and 12*n* are welded together.

The electrode tab 12*n* of the battery cell 10*f* protrudes outside the first case 40 through the slit 42*f* and is bent by the third step so as to overlap the total minus bus bar 60*b*. In other words, the electrode tab 12*n* of the battery cell 10*f* protrudes from the slit 42*f*, bends upwards at approximately 90 degrees, and abuts against the total minus bus bar 60*b* near the slit 42*f*. The laser for welding is irradiated onto the abutting portion, and the electrode tab 12*n* and the total minus bus bar 60*b* are welded together.

As illustrated in FIG. 7B, the second case 50 includes four housing portions 57*a* to 57*d*. The back portion of the front central region of the second case 50 is divided in the up-down direction into the four housing portions 57*a* to 57*d* by three insulating portions 56*a* to 56*c*. The electrode tab 12*n* of the battery cell 10*a* is disposed in the housing portion 57*a*. The electrode tab 12*p* of the battery cell 10*b* adjacent to the upper portion of the battery cell 10*a* is disposed in the housing portion 57*b*. The electrode tab 12*p* of the battery cell 10*c* adjacent to the upper portion of the battery cell 10*b* is disposed in the housing portion 57*b*. The electrode tabs 12*p* and 12*n* at the back of the battery cells 10*d*, 10*e*, and 10*f* are similarly arranged alternately in the housing portions 57*c* and 57*d*. Consequently, one, two, two, and one electrode tabs are respectively housed in the four housing portions 57 of the second case 50 from bottom to top, with the electrode tabs 12*p* and 12*n* being arranged alternately.

The electrode tabs 12*p* and 12*n* of the battery cells 10*a* to 10*f* protrude outside the second case 50 through the slits 52*a* to 52*f* and are bent by the third step so as to be folded and overlapping each other. Specifically, the electrode tab 12*p* protrudes from the slit 52, bends downwards at approximately 90 degrees, and abuts against the electrode tab 12*n* of the downwardly adjacent battery cell 10 near the slit 52. The electrode tab 12*n* protrudes from the slit 52, bends upwards at approximately 90 degrees, and abuts against the electrode tab 12*p* of the upwardly adjacent battery cell 10 near the slit 52. The laser for welding is irradiated onto the abutting portion, and the electrode tabs 12*p* and 12*n* are welded together.

By thus being bent in vertically opposite directions, the electrode tabs 12*p* and 12*n* of each battery cell 10 are each connected to the electrode tab of opposite polarity of the adjacent battery cell 10. Ultimately, the six battery cells 10 are connected in series.

Figure 8:
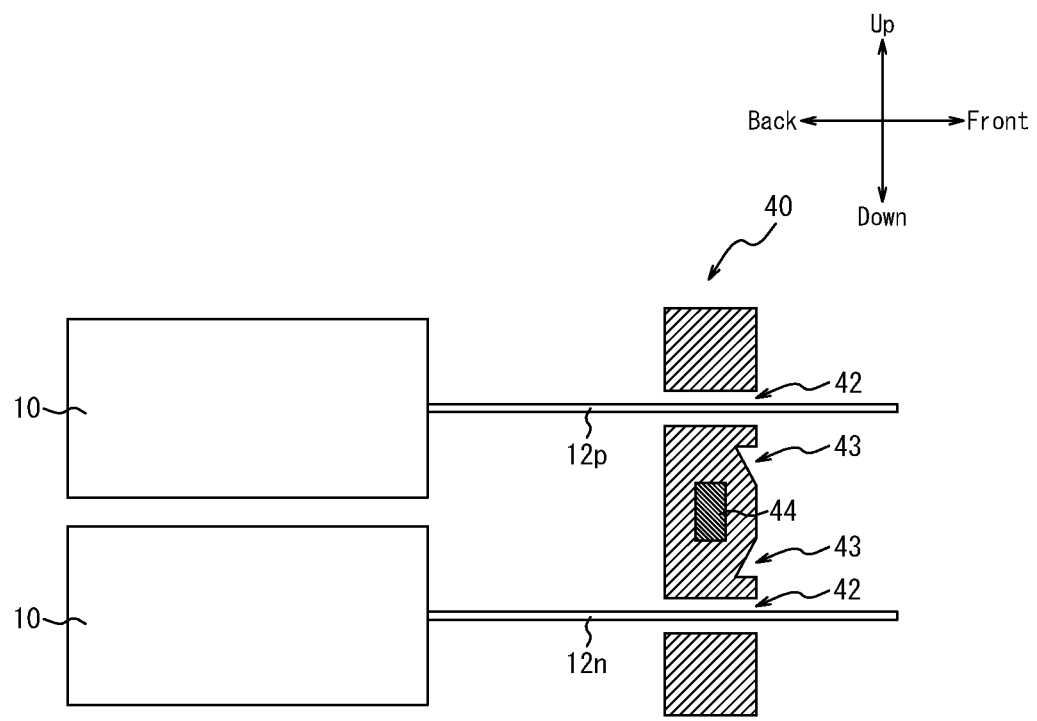
FIG. 8 illustrates an example of a recess provided on the outer wall of the case.

As described above, the electrode tab 12*p* or 12*n* is bent at substantially 90 degrees so that electrode tabs of adjacent battery cells are folded and overlapping with each other near the slit 42 or 52. As illustrated in FIG. 8, recesses 43 may be provided near the slits 42 on the outer wall of the first case 40. The recesses 43 are recessed towards the inner perimeter of the first case 40. The electrode tabs 12*p* and 12*n* protruding from the slits 42 are bent towards the recesses 43. This configuration enables the electrode tabs 12*p* and 12*n* to bend 90 degrees or more. Weldability can thereby be improved, even when the electrode tabs 12*p* and 12*n* have a large spring back. As in the first case 40, recesses 53 may also be provided in the second case 50 near the slits 52 on the outer wall of the second case 50. The recesses 43 in FIG. 7A are shaped to increase in depth closer to the protruding electrode tabs 12*p* and 12*n* (i.e. the cross-sectional shape is triangular), but this configuration is not limiting. For example, the cross-sectional shape may be rectangular. The recesses 43 may have any shape that provides a space allowing bending to an angle of 90 degrees or more.

As also illustrated in FIG. 8, a metal plate 44 may be formed by insertion molding near the slits 42 (between slits 42) on the outer wall of the first case 40. The metal plate 44 is formed by insertion molding inside the outer wall that faces the folded and overlapping portion of the electrode tabs 12*p* and 12*n*, as illustrated in FIG. 8. If the laser penetrates the electrode tabs at the time of welding, this configuration can receive the laser with the metal plate 44 to protect the battery cells 10. As in the first case 40, a metal plate may also be formed by insertion molding in the second case 50 near the slits 52 (between slits 52) on the outer wall of the second case 50. FIG. 8 illustrates an example of the recess 43 and the metal plate 44 being provided in the outer wall of the case, but a configuration that provides only one of the recess 43 and the metal plate 44 may be adopted.

Figure 9A:
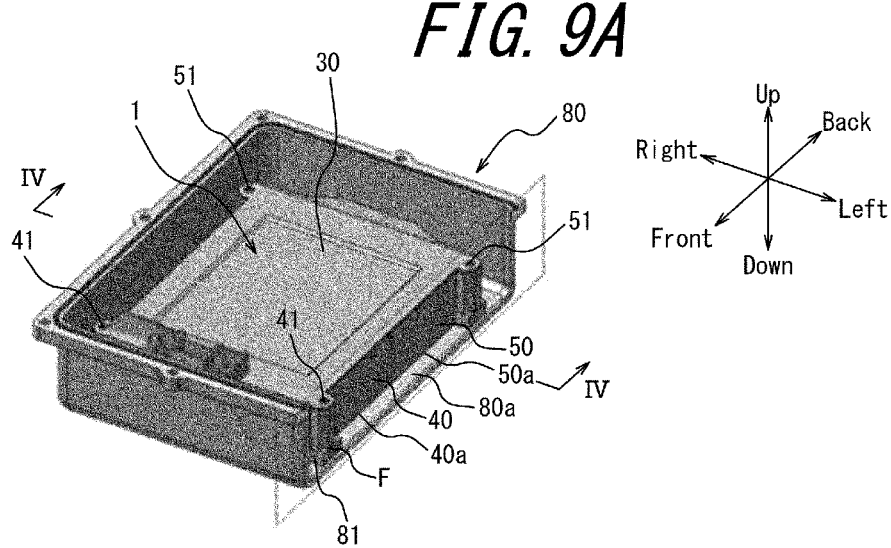
FIG. 9A is a perspective view, from the top, illustrating a cross-section of a body supporting a battery pack housed in the body.
Figure 9B:
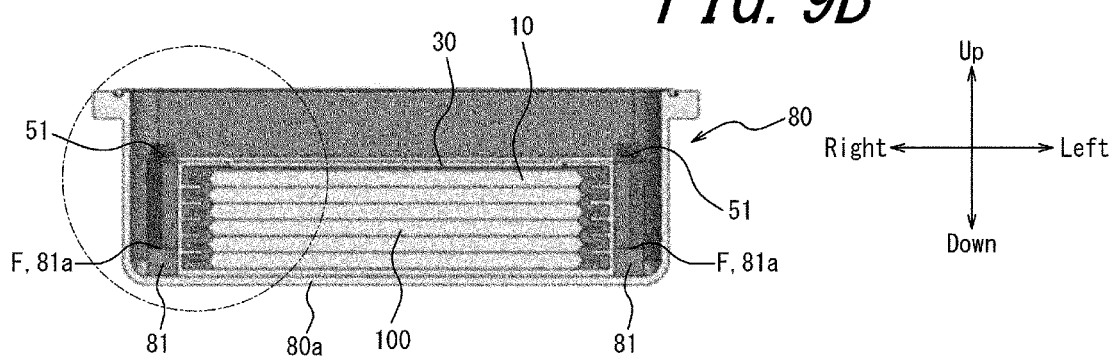
FIG. 9B is a cross-sectional view along the IV-IV line of FIG. 9A.
Figure 9C:
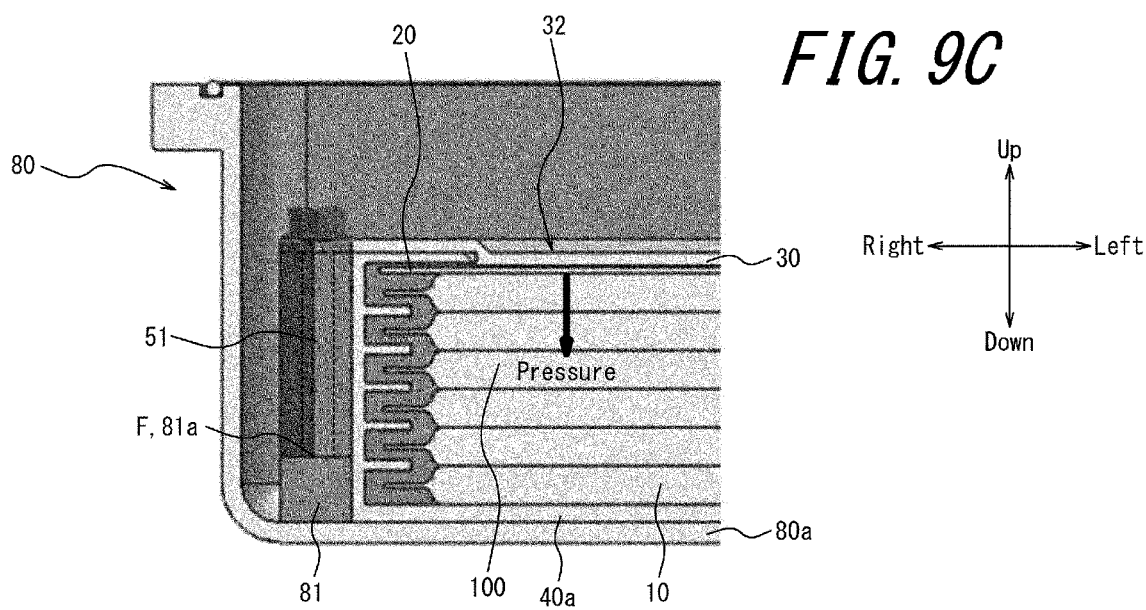
FIG. 9C illustrates an enlargement of the portion surrounded by a dashed line in FIG. 9B.

FIGS. 9A through 9C illustrate the battery pack 1 housed in a body 80. FIG. 9A is a perspective view, from the top, illustrating a cross-section of the body 80 supporting the battery pack 1. FIG. 9B is a cross-sectional view along the IV-IV line of FIG. 9A. FIG. 9C illustrates an enlargement of the portion surrounded by a dashed line in FIG. 9B.

The body 80 is suitably configured by a metal material such as aluminum. This configuration is not limiting, and the body 80 may be made of any highly rigid material. For example, the body 80 may be made of a highly rigid resin material or a metal material provided with an electrically insulating material, such as PET resin, on the surface thereof.

The battery pack 1 is fixed to the inside of the body 80 by a suitable method, such as screwing. In greater detail, the battery pack 1 is housed inside the body 80 with the bottom surface 40*a* of the first case 40 and the bottom surface 50*a* of the second case 50 abutting against a bottom surface 80*a* of the body 80. At this time, the bottom surface 80*a* of the body 80 functions as a restraining member for restraining the stacked battery cells 10 from below, like the upper restraining plate 30. The stacked battery cells 10 are thus restrained indirectly by the bottom surface 80*a* as a result of abutting against the bottom surface 40*a* of the first case 40 and the bottom surface 50*a* of the second case 50, which abut against the bottom surface 80*a*. This configuration is not limiting, however. The bottom surface 80*a* need not abut against the bottom surface 40*a* of the first case 40 and the bottom surface 50*a* of the second case 50 if, for example, the bottom surface 40*a* and the bottom surface 50*a* themselves can function as a restraining member with sufficient rigidity.

As illustrated in FIGS. 9A through 9C, fixing portions F of the first case 40 and the second case 50 relative to the body 80 are provided farther inward than the bottom surface 80*a* of the body 80. The fixing portions F are thus positioned above the bottom surface 80a to be closer to the center of gravity of a battery cell assembly 100 formed by six stacked battery cells 10.

The fixing portions F may, for example, be configured as follows. The two screw holes 41 of the first case 40 may be configured to penetrate from the upper surface to the lower surface of the first case 40, for example. Similarly, the two screw holes 51 of the second case 50 may be configured to penetrate from the upper surface to the lower surface of the second case 50, for example. To support the two screw holes 41 and the two screw holes 51, the body 80 includes supports 81 protruding inward from the bottom surface 80a at corresponding positions. Screw holes 81a are provided on the upper surface of the supports 81. The screws inserted from above through the two screw holes 41 and the two screw holes 51 are screwed into the screw holes 81a. For example, the first case 40 and the second case 50 may be fixed to the body 80 by screws being inserted into the screw holes 41 and the screw holes 51 and screwed into the screw holes 81a. The fixing portion F may thus be formed by the screw hole 41 or the screw hole 51 together with the screw hole 81a.

In this way, the bottom surface of the battery pack 1 is fixed in a state of abutment against the bottom surface 80a of the body 80. Accordingly, the bottom side of the battery pack 1 is firmly restrained from below by the bottom surface 80a of the body 80. If the top side of the battery pack 1 were only configured by the first case 40, the second case 50, and the insulating sheet 20, then the restraining force would be weaker than at the bottom side. This problem is addressed by the restraining plate 30 being fixed to the first case 40 and the second case 50 to cover the battery cell assembly 100 from one side in the stacking direction, i.e. from above, while the battery pack 1 is fixed to the body 80. As described above, the restraining plate 30 includes the recess 32 that is recessed one step towards the upper surface of the battery cell assembly 100. The insulating sheet 20 is disposed between the restraining plate 30 and the upper surface of the battery cell assembly 100 at this time. The insulating sheet 20 abuts against the recess 32 of the restraining plate 30 and the upper surface of the battery cell assembly 100. On the other hand, the bottom surface 40a of the first case 40 and the bottom surface 50a of the second case 50 abut against the bottom surface 80a of the body 80. In other words, the upper surface of the battery cell assembly 100 is pressed from above by the restraining plate 30 while, simultaneously, the lower surface of the battery cell assembly 100 is supported by the bottom surface 80a of the body 80 via the abutment against the bottom surface 40a of the first case 40 and the bottom surface 50a of the second case 50. The position of each battery cell 10 in the up-down direction is thereby regulated. At this time, gas produced inside the battery cells 10 due to deterioration over time tends to collect around the battery cells 10 due to pressure in the stacking direction. In other words, the internal gas collects at a location away from the electrodes formed in the central region.

Typically, the battery characteristics of the battery cell 10 and the pressure in the stacking direction of the battery cells 10 are correlated. Specifically, the electrode spacing inside the battery cells 10 stabilizes when a predetermined pressure is applied. The internal resistance therefore lowers, and the battery characteristics of the battery cells 10 improve. On the other hand, application of excessive pressure impedes the chemical reaction itself inside the battery cell 10, and the battery characteristics worsen. Therefore, when the battery pack 1 is assembled, the restraining plate 30 is preferably fixed to apply pressure within a predetermined pressure range in order to obtain good battery characteristics that are stable over time. Even if the battery cells 10 swell due to deterioration over time, which by reaction would increase the pressure in the stacking direction of the battery cells 10, an optimal pressure capable of maintaining battery characteristics can still be secured.

In the above-described battery pack 1 according to the first embodiment, the electrode tabs 12p and 12n of the battery cells 10 are caused to protrude through the slits 42, 52 of the first case 40 and the second case 50. The electrode tabs 12p and 12n protruding through the slits 42, 52 are then bent so that electrode tabs of adjacent battery cells 10 are folded and overlap each other, and the folded and overlapping portion is welded. The electrode tabs 12p and 12n of the battery cells 10 can thereby be welded without being trimmed.

The battery pack 1 according to the first embodiment enables bending towards the recesses 43, 53 provided on the outer wall of the first case 40 and second case 50 near the slits 42, 52. The electrode tabs 12p and 12n can therefore bend 90 degrees or more. Weldability can thereby be improved, even when the electrode tabs 12p and 12n have a large spring back.

The outer surface 13 perpendicular to the stacking direction of the battery cells 10 is restrained by the restraining plate 30 in the battery pack 1. Swelling in the stacking direction of the battery cells 10 can thereby be suppressed if an internal gas is produced during use of the battery pack 1, during charging/discharging, or by deterioration over time. When the restraining plate 30 is made of a metal material, the rigidity thereof increases, and the battery pack 1 can effectively suppress swelling of the battery cells 10.

Provision of the insulating sheet 20 and the restraining plate 30 on only one side of the stacked battery cells 10 can reduce the number of components and increase productivity of the battery pack 1. In this way, the battery pack 1 is advantageous in terms of the number of components and productivity as compared to a known battery pack in which a cell cover is provided for each battery cell, for example, to protect the battery cells. The simplified configuration of the battery pack 1 can, in other words, contribute to improving productivity and reducing costs. By the battery cells 10 being fixed together, the battery cell 10 and the insulating sheet 20 being fixed together, and the insulating sheet 20 and restraining plate 30 being fixed together by adhesive, the resistance of the battery pack 1 to vibration or shock improves. For example, when the battery pack 1 is mounted in a vehicle, the relative displacement between components due to vibration, shock, or the like when the vehicle is moving can be prevented. In this way, the components inside the battery pack 1 are firmly fixed to each other to prevent damage to the internal components from vibration or shock.

The battery pack 1 can achieve a smaller size and a lower profile while suppressing swelling of the stacked battery cells 10. Specifically, swelling in the stacking direction of the battery cells 10 can be suppressed in the battery pack 1 by the upper surface of the battery cell assembly 100 being pressed from one side in the stacking direction by the restraining plate 30 while the lower surface is abutted against the bottom surface 40a of the first case 40 and the bottom surface 50a of the second case 50. At the same time, only one restraining plate 30 is used, providing the battery pack 1 with a smaller size, a lower profile, and a lighter weight than a conventional battery module that includes a plurality of restraining plates. Similarly, the battery pack 1 can contribute to reducing the number of components and the cost.

The battery pack 1 can suppress deterioration of the first case 40 and the second case 50 by including the opening O. If the opening O were omitted, and the restraining plate 30 were provided directly on the upper surface of the first case 40 and the second case 50, then the restraining plate 30 would apply pressure directly on these cases, causing the cases to deform and accelerating deterioration. Accordingly, the battery pack 1 can prevent damage to the case due to such degradation over time.

The configuration of the recess 32 of the restraining plate 30 in the battery pack 1 enables suitable application of pressure to the central region of the outer surface 13 of the battery cell 10 that is perpendicular to the stacking direction. The battery pack 1 can thereby further suppress swelling in the stacking direction of the battery cells 10. The application of pressure with the restraining plate 30 enables suitable retention of the battery cell assembly 100 inside the first case 40 and the second case 50, thereby making retention more reliable in the battery pack 1. In other words, the battery pack 1 can more firmly fix the battery cell assembly 100 by the pressure from the recess 32. Application of pressure within an optimal range capable of maintaining good battery characteristics in the battery pack 1 can stabilize the internal resistance in the battery cells 10. The pressure in the battery pack 1 releases internal gas from near the electrodes to the outer periphery of the battery cells 10, thereby suppressing degradation of the battery cells 10. In other words, the battery pack 1 suppresses the degradation of battery characteristics that occurs when internal gas is present between electrodes. In particular, the battery pack 1 can concentrate more pressure on the central region of the outer surface 13 of the battery cells 10 and more effectively suppress swelling of the battery cells 10 in the stacking direction by the surface of the recess 32 being formed to protrude further inward towards the central region. In this case, the battery pack 1 can more efficiently collect the internal gas at the outer periphery of the battery cells 10.

By the arrangement of the insulating sheet 20, the battery pack 1 can secure electrical insulation between the restraining plate 30 and the internal battery cells 10.

The battery cell assembly 100 can also be further supported in the battery pack 1 by the bottom surface 40a of the first case 40 and the bottom surface 50a of the second case 50 abutting against the bottom surface 80a of the body 80. In particular, the battery pack 1 includes the restraining plate 30 on the upper surface side, whereas the bottom surface of the battery pack 1 abuts against the bottom surface 80a of the body 80. The battery cell assembly 100 is thereby firmly restrained from both sides in the up-down direction. Furthermore, as a result of the restraint provided by the restraining plate 30 and the bottom surface 80a in the up-down direction, the first case 40 and the second case 50 tend not to warp even when supporting the battery cell assembly 100. In other words, warping of the first case 40 and the second case 50 is regulated by the restraining plate 30 and the bottom surface 80a.

The battery pack 1 can fix the battery cell assembly 100, which is a heavy load, in a balanced manner by the fixing portions F being arranged closer to the center of gravity of the battery cell assembly 100. For example, when the battery pack 1 is mounted in a vehicle, the stress occurring due to vibration, shock, or the like when the vehicle is moving can be relieved. Consequently, the battery pack 1 can contribute to improving product reliability. This arrangement in the battery pack 1 can also contribute to lowering the profile.

The first case 40 and the second case 50 in the battery pack 1 are made of a resin material or a metal material provided with an electrically insulating material on the surface thereof. Electrical insulation can thereby be secured between components external to the battery pack 1, such as electrical components, and the battery cells 10 inside the battery pack 1.

The electrical insulation in the battery pack 1 can be further improved by forming the restraining plate 30 from a metal material coated with an electrically insulating material or a resin material, like the first case 40 and the second case 50. In this case, the restraining plate 30 can be reduced in weight, and the battery pack 1 can be manufactured at a low cost. This contributes to a reduction in weight and cost of the battery pack 1 itself.

Second Embodiment

Figure 10A:
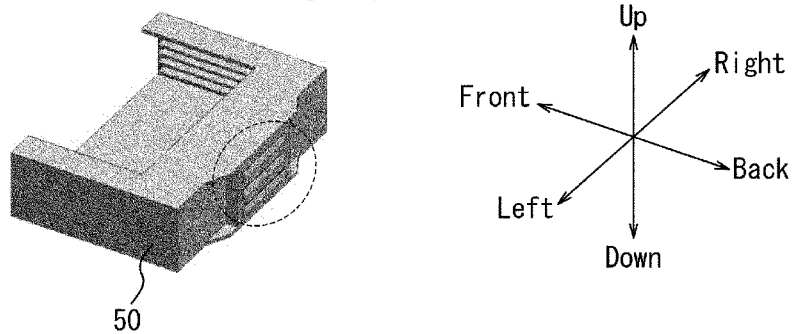
FIG. 10A is a perspective view illustrating the appearance of a second case of a battery pack according to a second embodiment of the present disclosure.
Figure 10B:
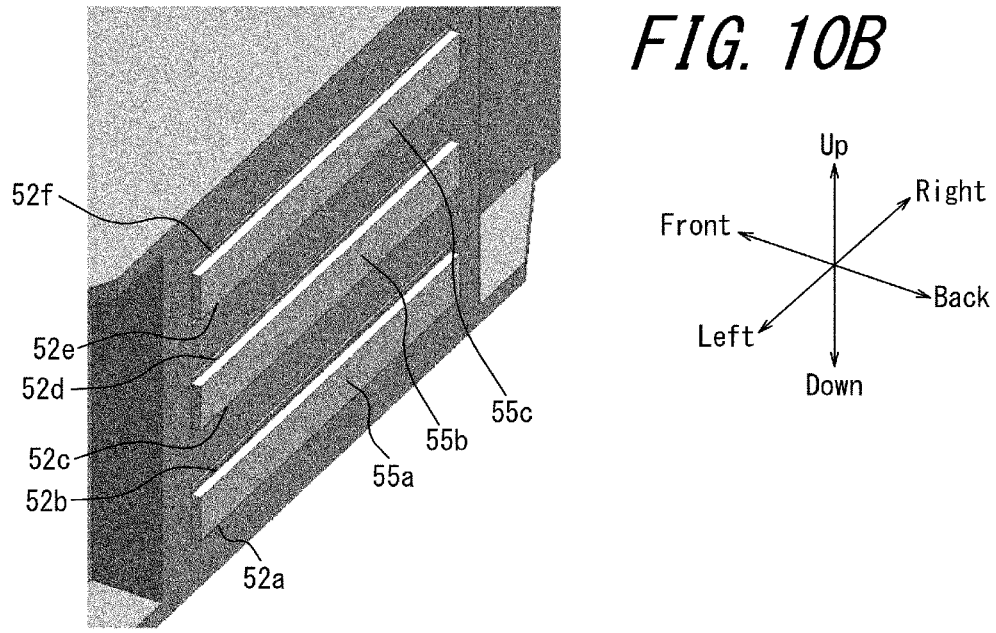
FIG. 10B is an enlarged view of the central region of the back surface in the second case of the battery pack according to the second embodiment of the present disclosure.
Figure 10C:
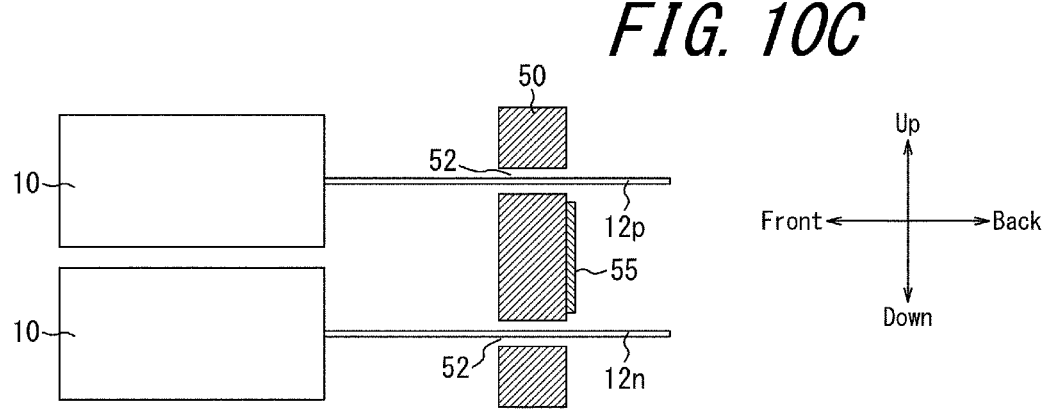
FIG. 10C is a schematic diagram illustrating the inside of the central region of the back surface in the second case of the battery pack according to the second embodiment of the present disclosure.

FIG. 10A is a perspective view illustrating the appearance of a second case 50 of a battery pack 1 according to a second embodiment of the present disclosure. FIG. 10A is a perspective view of the second case 50. FIG. 10B illustrates an enlargement of the central region on the back surface of the second case 50. FIG. 10C schematically illustrates the inside of the central region on the back surface of the second case 50. The battery pack 1 according to the second embodiment differs from the first embodiment in the use of tab connecting bus bars 55 for connection between cells. The configuration that is the same as in the first embodiment is labeled with the same reference signs below. A description of this configuration is omitted to focus on the differences from the first embodiment.

As illustrated in FIG. 10B, the battery pack 1 according to the second embodiment includes tab connecting bus bars 55 in the central region on the back surface of the second case 50. The tab connecting bus bars 55 are referred to below as the tab connecting bus bars 55a, 55b, 55c, in order from bottom to top. The tab connecting bus bar 55a is provided on the outer wall between the slit 52a and the slit 52b. The tab connecting bus bar 55b is provided on the outer wall between the slit 52c and the slit 52d. The tab connecting bus bar 55c is provided on the outer wall between the slit 52e and the slit 52f.

As illustrated in FIG. 10C, the electrode tab 12p or the electrode tab 12n protrudes from each slit 52. The protruding electrode tabs 12p and 12n are bent so that the electrode tabs of adjacent battery cells 10 are folded and overlap each other. Specifically, the electrode tab 12p protrudes from the slit 52, bends downwards at approximately 90 degrees, and abuts against the electrode tab 12n of the downwardly adjacent battery cell 10 near the slit 52. The electrode tab 12p further abuts against the tab connecting bus bar 55. The electrode tab 12n protrudes from the slit 52, bends upwards at approximately 90 degrees, and abuts against the electrode tab 12p of the upwardly adjacent battery cell 10 near the slit 52. The laser for welding is irradiated onto the abutting portion, and the electrode tabs 12p, 12n and the tab connecting bus bar 55 are welded together.

Figure 11A:
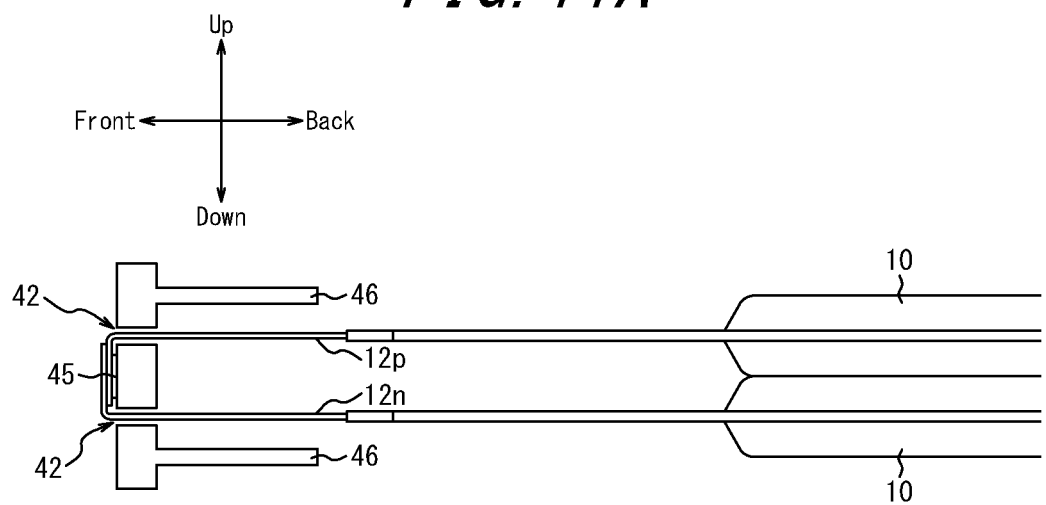
FIG. 11A is a schematic diagram illustrating the inside of the case of the battery pack according to the second embodiment of the present disclosure.
Figure 11B:
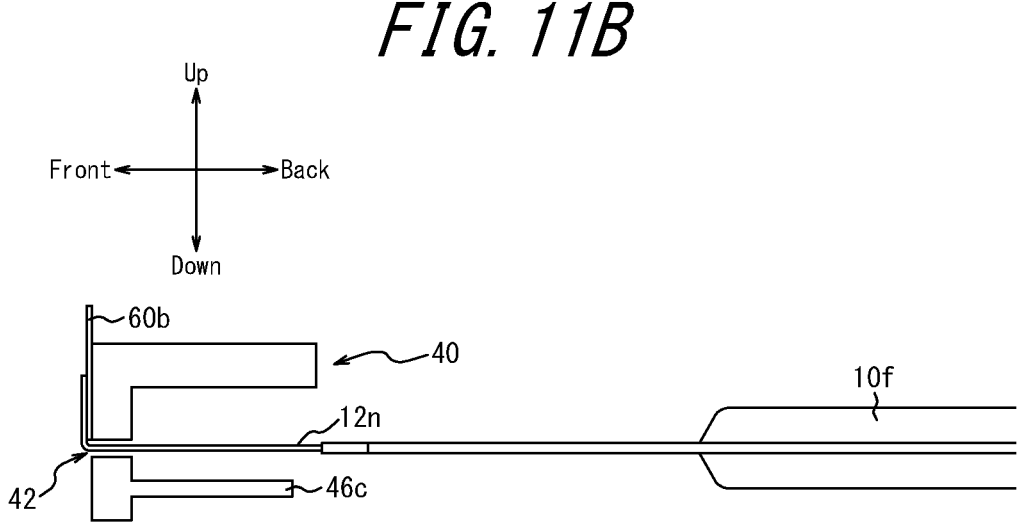
FIG. 11B is a schematic diagram illustrating the inside of the case of the battery pack according to the second embodiment of the present disclosure.

Tab connecting bus bars 45 are similarly provided in the first case 40. FIGS. 11A and 11B schematically illustrate the inside of the central region on the front surface of the first case 40. FIG. 11A schematically illustrates a portion where the tab connecting bus bar 45 is provided, and FIG. 11B schematically illustrates a portion connected to the total minus bus bar 60b.

As illustrated in FIG. 11A, the electrode tab 12p or the electrode tab 12n protrudes from each slit 42 of the first case 40. The protruding electrode tabs 12p and 12n are bent so that the electrode tabs of adjacent battery cells 10 are folded and overlap each other. Specifically, the electrode tab 12*p* protrudes from the slit 42, bends downwards at approximately 90 degrees, and abuts against the electrode tab 12*n* of the downwardly adjacent battery cell 10 near the slit 52. The electrode tab 12*p* further abuts against the tab connecting bus bar 45. The electrode tab 12*n* protrudes from the slit 42, bends upwards at approximately 90 degrees, and abuts against the electrode tab 12*p* of the upwardly adjacent battery cell 10 near the slit 52. The laser for welding is irradiated onto the abutting portion, and the electrode tabs 12*p*, 12*n* and the tab connecting bus bar 45 as a metal member are welded together.

As illustrated in FIG. 11B, the electrode tab 12*n* of the battery cell 10*f* protrudes outside of the first case 40 from the slit 42*f* and is bent so as to overlap the total minus bus bar 60*b*. In other words, the electrode tab 12*n* of the battery cell 10*f* protrudes from the slit 42*f*, bends upwards at approximately 90 degrees, and abuts against the total minus bus bar 60*b* near the slit 42*f*. The laser for welding is irradiated onto the abutting portion, and the electrode tab 12*n* and the total minus bus bar 60*b* are welded together.

Figure 12A:
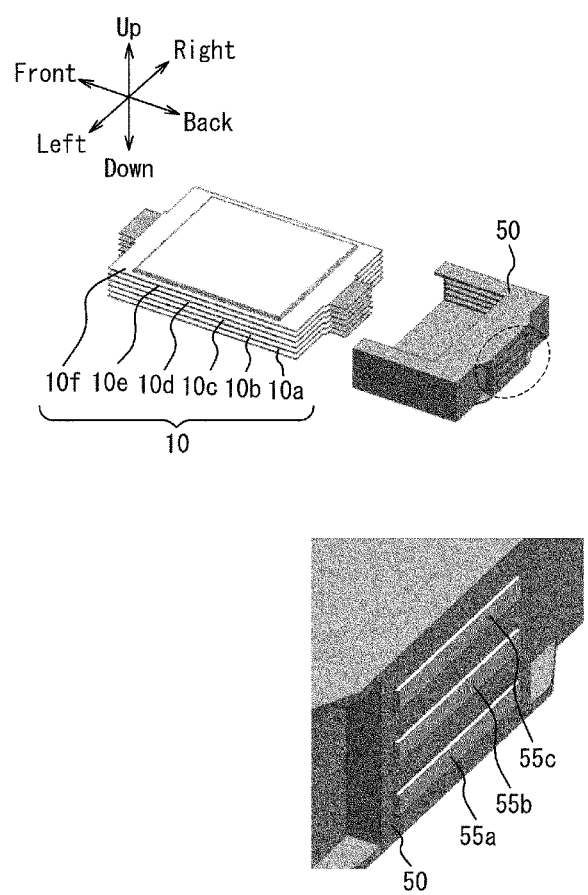
FIG. 12A is a schematic diagram illustrating a first step for assembling the battery pack according to the second embodiment of the present disclosure.
Figure 12B:
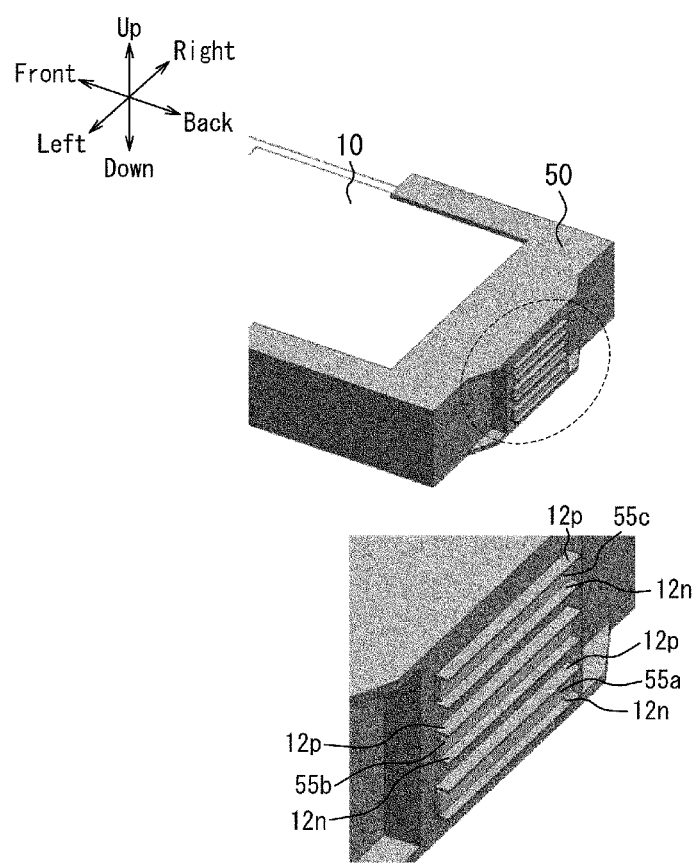
FIG. 12B is a schematic diagram illustrating a second step for assembling the battery pack according to the second embodiment of the present disclosure.
Figure 12C:
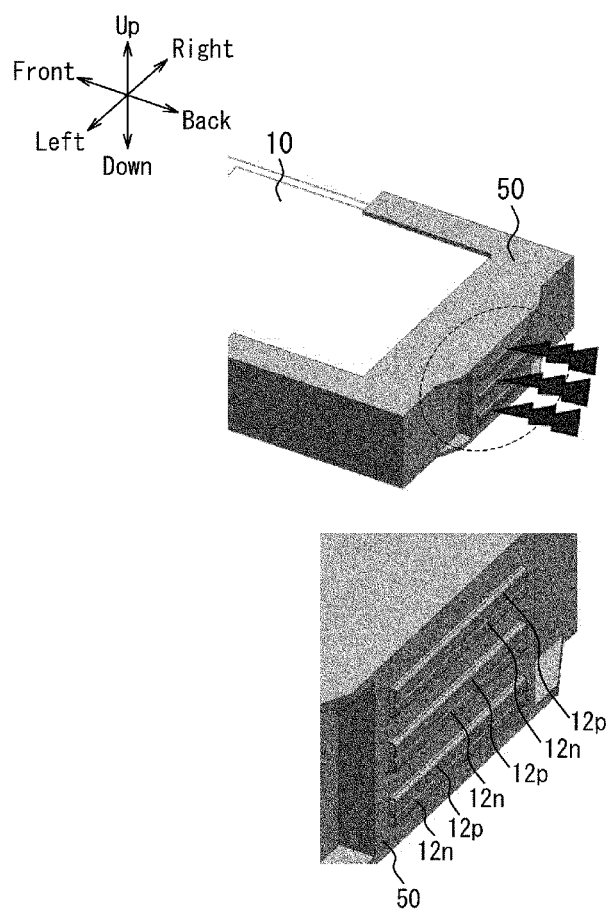
FIG. 12C is a schematic diagram illustrating a third step for assembling the battery pack according to the second embodiment of the present disclosure.

FIGS. 12A through 12C are schematic diagrams respectively illustrating representative first through third steps for assembling the battery pack 1 according to the second embodiment. In the first step illustrated in FIG. 12A, the six stacked battery cells 10 are inserted in the second case 50. In this state, the first case 40 is fitted onto the second case 50, which is holding the battery cells 10 and the insulating sheet 20, from the front. In the second step illustrated in FIG. 12B, the electrode tabs 12*p* and 12*n* of the battery cells 10 are caused to protrude from the slits 42 of the first case 40 and the slits 52 of the second case 50. In the third step illustrated in FIG. 12C, the electrode tabs 12*p* and 12*n* protruding from the slits 42 of the first case 40 and the slits 52 of the second case 50 are bent to abut against the tab connecting bus bars 45, 55. Unlike FIGS. 10A to 10C, FIG. 11A, and FIG. 11B, the protruding electrode tabs 12*p* and 12*n* in FIGS. 12A to 12C are not folded to overlap with each other. Cells can be connected by the tab connecting bus bars 45, 55 when the tab connecting bus bars 45, 55 are used in this way. The electrode tabs 12*p* and 12*n* therefore do not necessarily need to be folded and overlapping with each other. The laser for welding is irradiated onto the electrode tabs 12*p* and 12*n* in this state, welding the electrode tabs 12*p* and 12*n* to the tab connecting bus bars 45, 55.

The above battery pack 1 according to the second embodiment achieves similar effects to those described in the first embodiment.

Modification

Figure 13A:
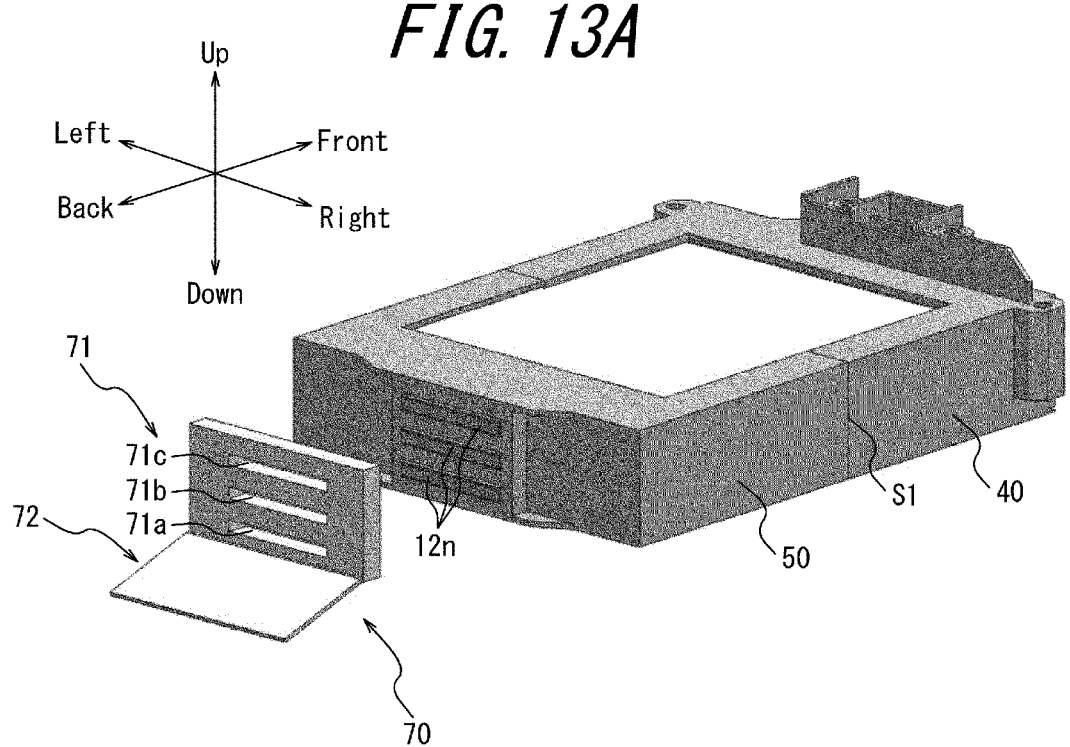
FIG. 13A illustrates an example of pressing electrode tabs, protruding from slits, against the outer wall of the case with a jig.
Figure 13B:
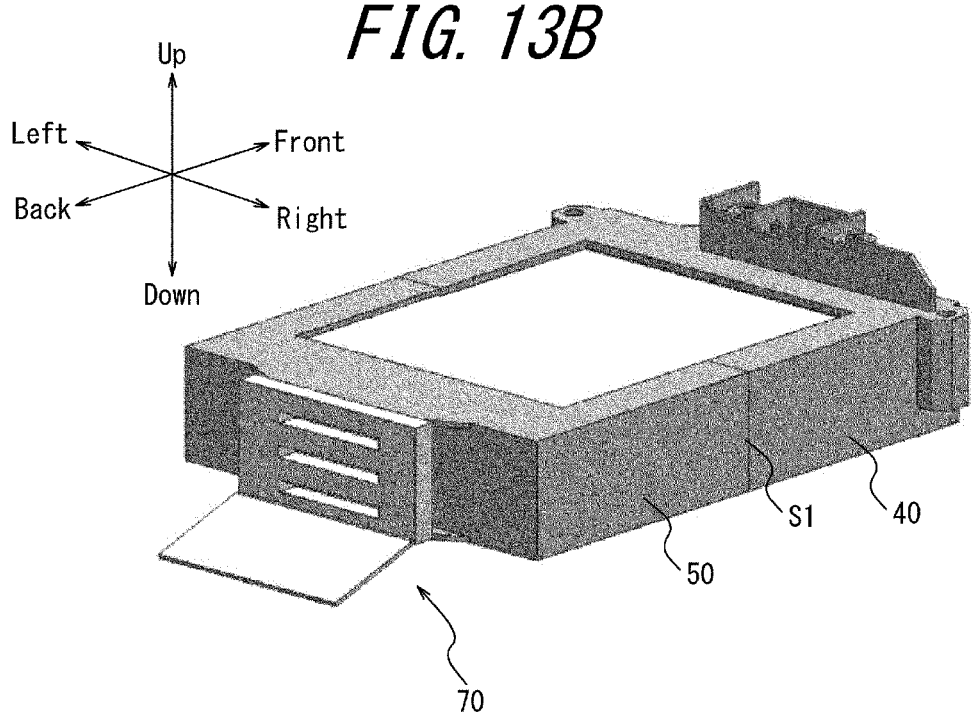
FIG. 13B illustrates an example of pressing electrode tabs, protruding from slits, against the outer wall of the case with a jig.

In the first and second embodiments, the electrode tabs 12*p* and 12*n* protruding from the slits 42 of the first case 40 and the slits 52 of the second case 50 may be pressed against the outer walls of the first case 40 and the second case 50 by a jig 70 (pressing member 70). FIGS. 13A and 13B illustrate an example of using the jig 70. The jig 70 illustrated in FIG. 13A includes windows 71 positioned facing the folded and overlapping portion of the electrode tabs 12*p* and 12*n*. The windows 71 are substantially rectangular and extend in the left-right direction. The windows 71 are referred to below as the windows 71*a*, 71*b*, and 71*c* in order from bottom to top. FIG. 13B illustrates the electrode tabs 12*p* and 12*n* being pressed against the outer walls of the first case 40 and the second case 50 by the jig 70. In this state, a laser is irradiated from the windows 71*a*, 71*b*, 71*c* to weld the electrode tabs 12*p* and 12*n*. In this way, the electrode tabs 12*p* and 12*n* can be reliably abutted, and the gap therebetween can be reduced to secure weldability.

The jig 70 is made of metal or heat-resistant resin and is covered by an electrically insulating material. Hence, a short-circuit can be prevented and dissolution of the jig at the time of welding can be suppressed when the electrode tabs 12*p* and 12*n* are abutted against the outer walls of the first case 40 and the second case 50.

An insulating cover 72 (window housing portion 72) may further be provided on the jig 70. The insulating cover 72 is, for example, attached to the lower portion of the jig 70 to be openable, as illustrated in FIGS. 13A and 13B. After the electrode tabs 12*p* and 12*n* are welded, the windows 71*a*, 71*b*, 71*c* are covered by the insulating cover 72. This configuration can secure insulation of the welded portion and improve the reliability of the battery pack 1.

Figure 14A:
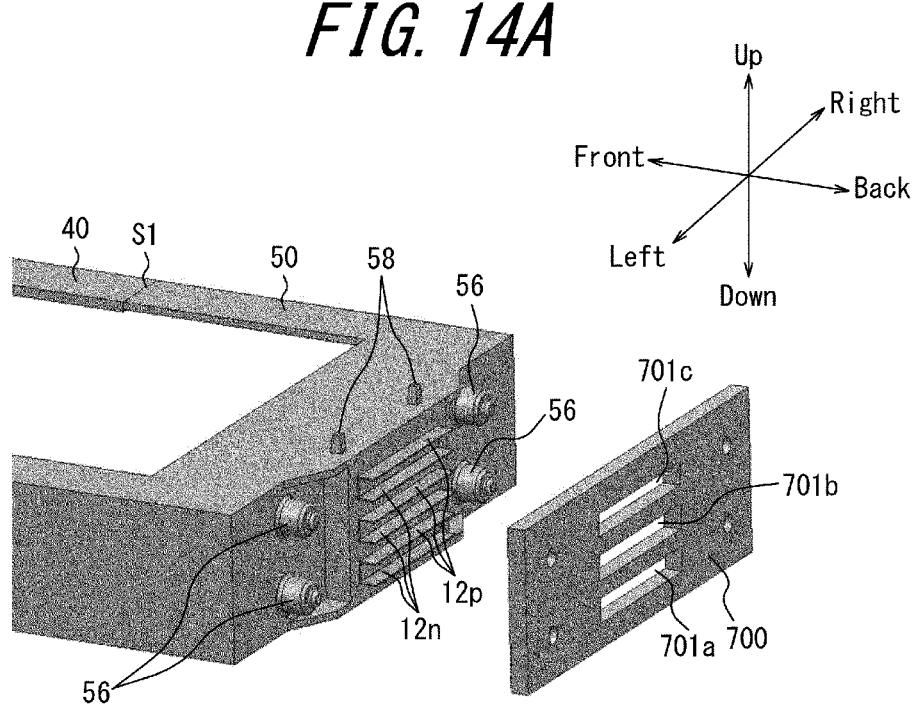
FIG. 14A illustrates an example of bending electrode tabs, protruding from slits, and pressing the electrode tabs against the outer wall of the case with a jig.
Figure 14B:
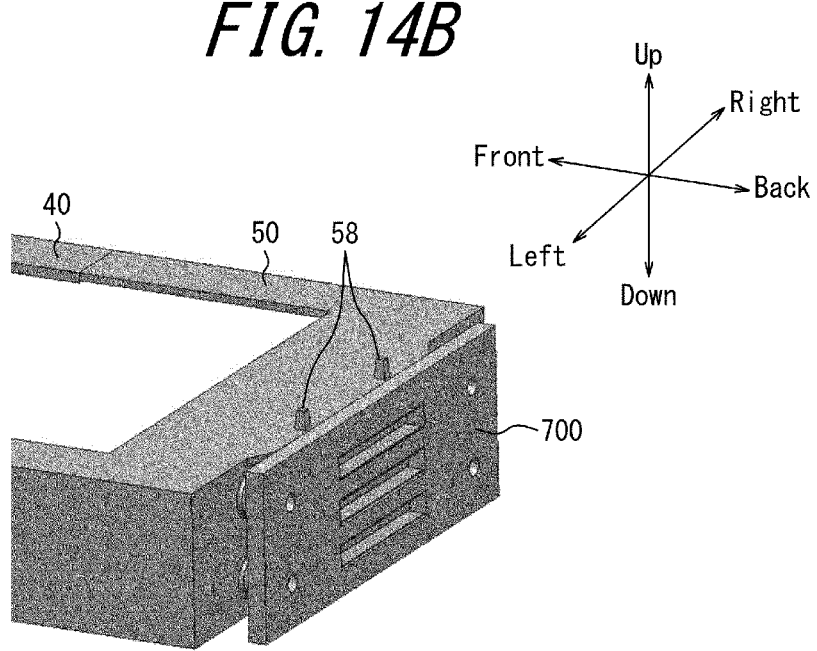
FIG. 14B illustrates an example of bending electrode tabs, protruding from slits, and pressing the electrode tabs against the outer wall of the case with a jig.

Furthermore, a jig may be used to bend the electrode tabs 12*p* and 12*n*. FIGS. 14A to 18 illustrate an example of a pressing member 700 that serves both to bend and press the electrode tabs 12*p* and 12*n*. Like the jig 70, the pressing member 700 includes windows 701 positioned facing the folded and overlapping portion of the electrode tabs 12*p* and 12*n*. The windows 701 are referred to below as the windows 701*a*, 701*b*, and 701*c* in order from bottom to top. FIG. 14A illustrates the state in which the electrode tabs 12*p* and 12*n* protrude from the slits 52 but are not yet bent. FIG. 14B illustrates the state in which the electrode tabs 12*p* and 12*n* are bent by the pressing member 700 and are pressed against the outer wall of the second case 50. Fitting portions 56 for positioning the pressing member 700 may be provided on the second case 50, as illustrated in FIG. 14A. In this case, fitting holes that fit onto the fitting portions 56 are provided in the pressing member 700.

Figure 15A:
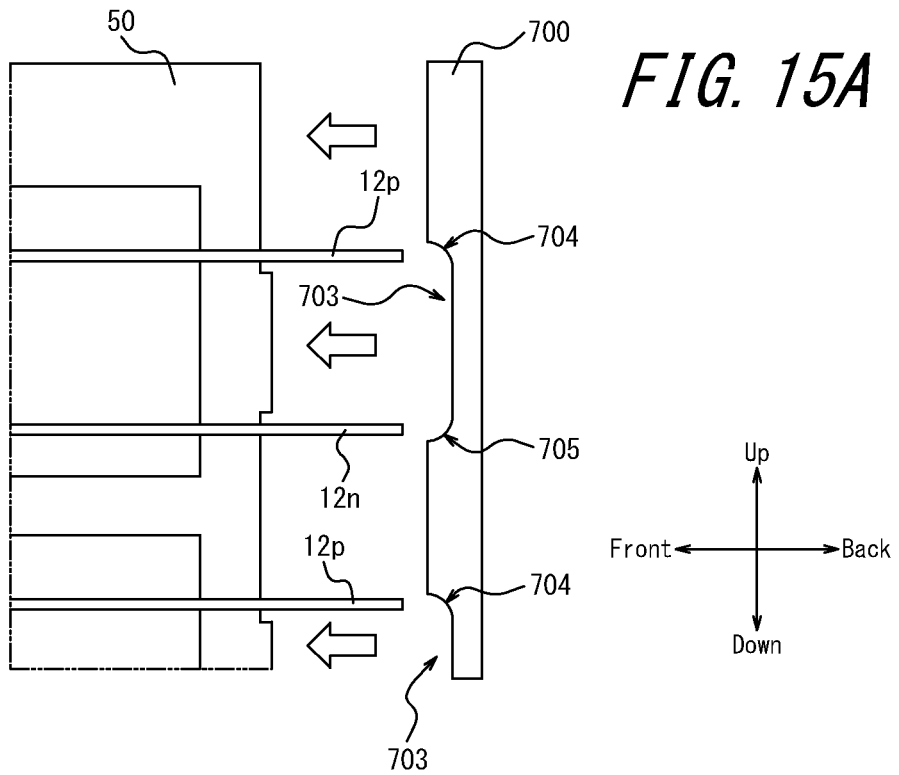
FIG. 15A is a schematic diagram illustrating electrode tabs, protruding from slits, being bent with a jig.
Figure 15B:
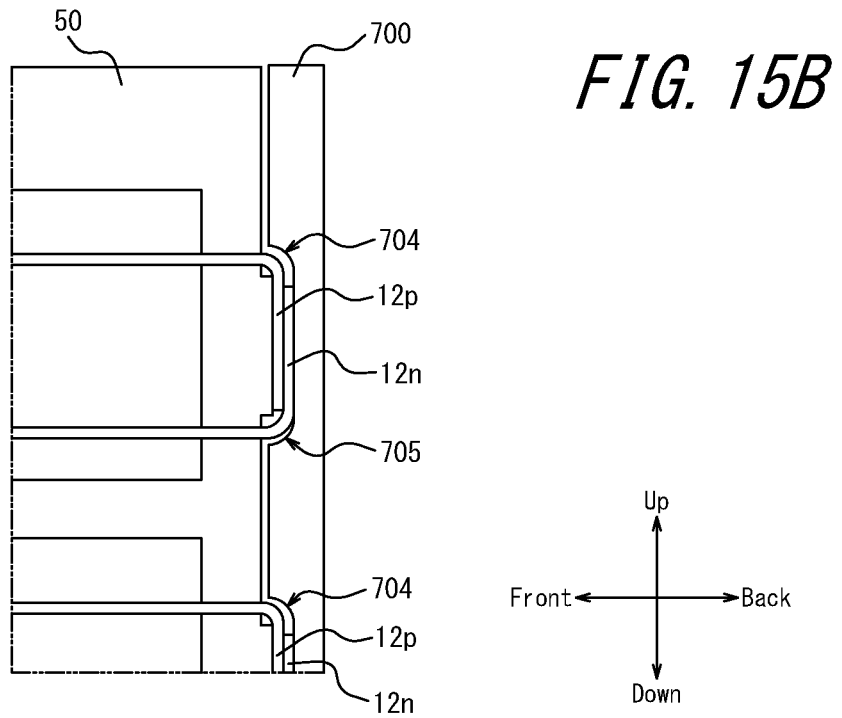
FIG. 15B is a schematic diagram illustrating electrode tabs, protruding from slits, being bent with a jig.

FIGS. 15A and 15B correspond to FIGS. 14A and 14B and illustrate the pressing member 700 being used to bend the electrode tabs 12*p* and 12*n*. The pressing member 700 includes recesses 703 for bending the electrode tabs 12*p* and 12*n*. Guides 704 and 705 are also provided for the electrode tabs 12*p* and 12*n* to be folded and overlap each other. The inner angles R of the guides 704, 705 are offset, so that the electrode tab 12*p* bends further inward than the electrode tab 12*n*, whereas the electrode tab 12*n* bends further outward than the electrode tab 12*p*. A protrusion may be provided near the center of the recess 703, for example. This configuration enables the electrode tabs 12*p* and 12*n* to bend 90 degrees or more. Weldability can thereby be improved, even when the electrode tabs 12*p* and 12*n* have a large spring back.

Figure 16:
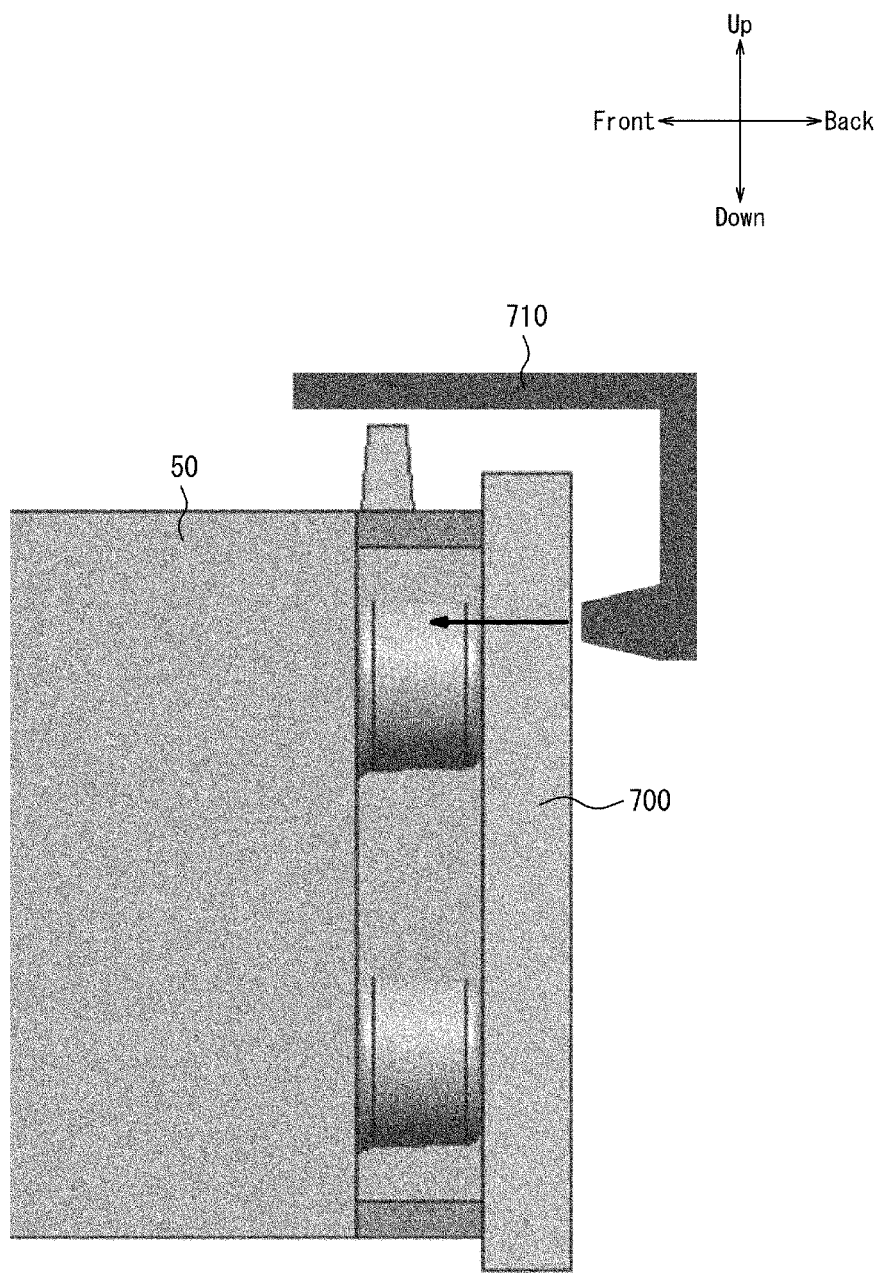
FIG. 16 is a schematic diagram illustrating an example of fixing the jig to the case with a fixing member.

The pressing member 700 may be fixed to the case by a fixing member. A fixing clamp removeable from the case, for example, may be used as the fixing member. FIG. 16 illustrates an example of fixing the pressing member 700 to the second case 50 with a fixing clamp 710. While the pressing member 700 is fixed by the fixing clamp 710, a laser is irradiated through the windows 701*a*, 701*b*, 701*c* to weld the electrode tabs 12*p* and 12*n*. The position at which the pressing member 700 is fixed by the fixing clamp 710 can be set freely. For example, the pressing member 700 may be fixed at two opposite corners thereof, or at four locations along the perimeter. Other than the fixing clamp 710, a clip or the like may also be used as the fixing member. Fixing the pressing member 700 with a fixing member in this way can secure weldability and improve productivity.

Figure 17A:
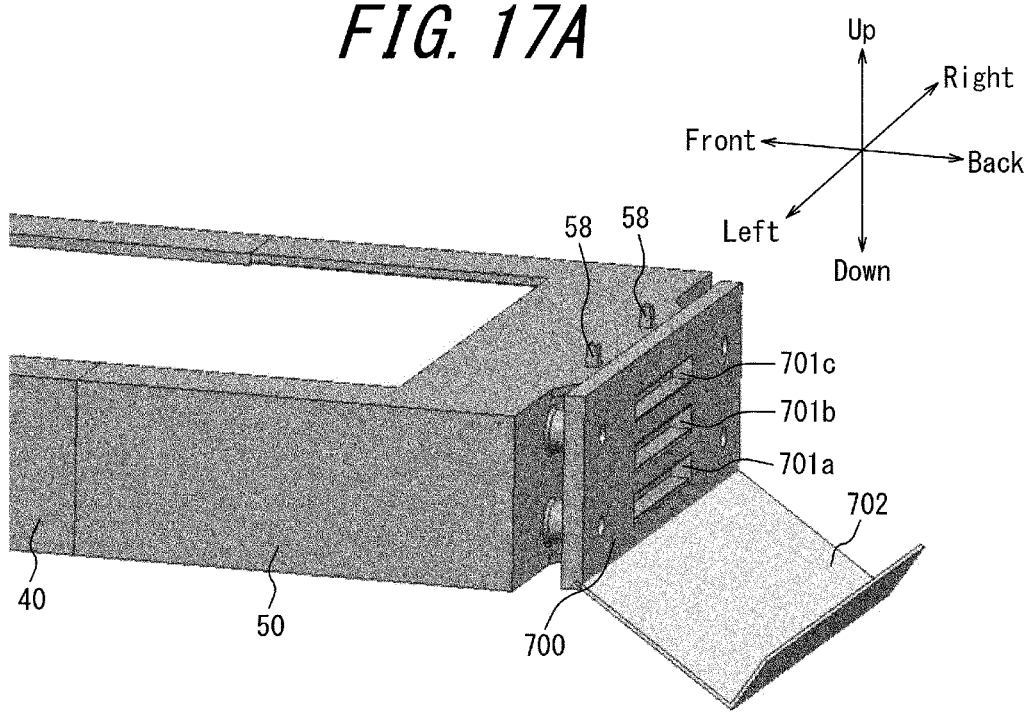
FIG. 17A is a perspective diagram illustrating how the jig includes a window housing portion that covers the windows of the jig.
Figure 17B:
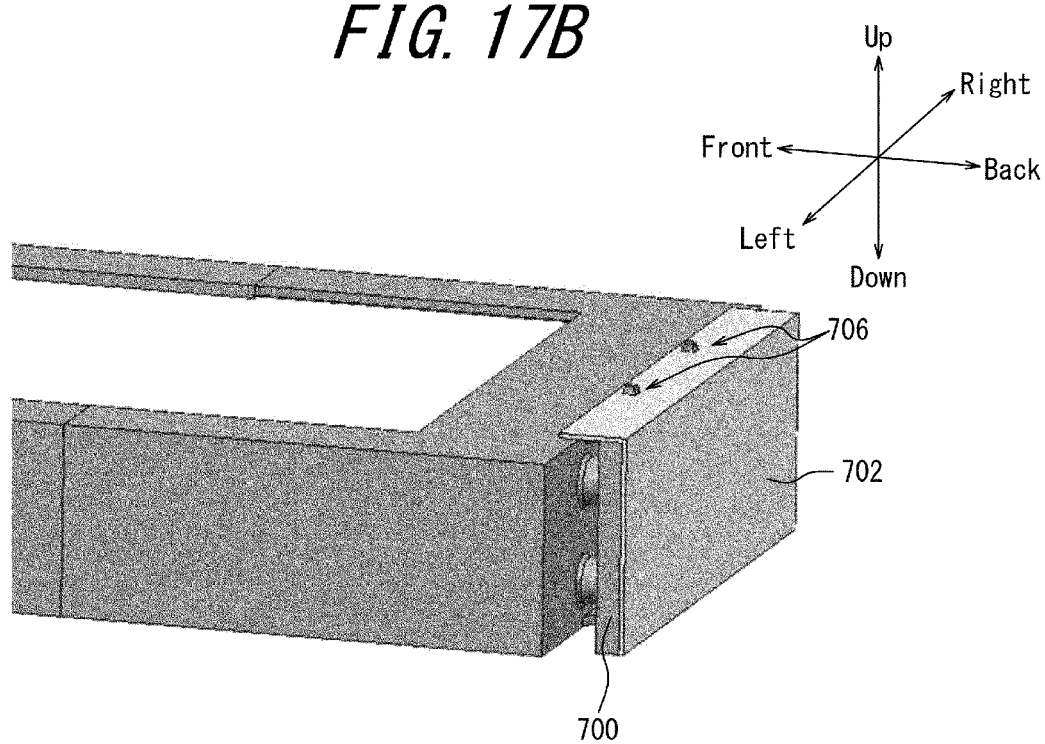
FIG. 17B is a perspective diagram illustrating how the jig includes a window housing portion that covers the windows of the jig.

An insulating cover 702 (window housing portion 702) may further be provided on the pressing member 700. The insulating cover 702 is, for example, attached to the lower portion of the pressing member 700 to be openable, as illustrated in FIG. 17A. After the electrode tabs 12p and 12n are welded, the insulating cover 702 is closed as illustrated in FIG. 17B to cover the windows 701a, 701b, 701c. Protrusions 58 for attaching the insulating cover 702 may be provided on the second case 50. In this case, engaging holes 706 are provided in the insulating cover 702 at positions corresponding to the protrusions 58. When the windows 701a, 701b, 701c are covered in this way by the insulating cover 702, insulation of the welded portion can be secured, and the reliability of the battery pack can be improved. The second case 50 has been described in FIGS. 14A to 18, but the pressing member 700 can similarly be used in the first case 40 as well.

Figure 18:
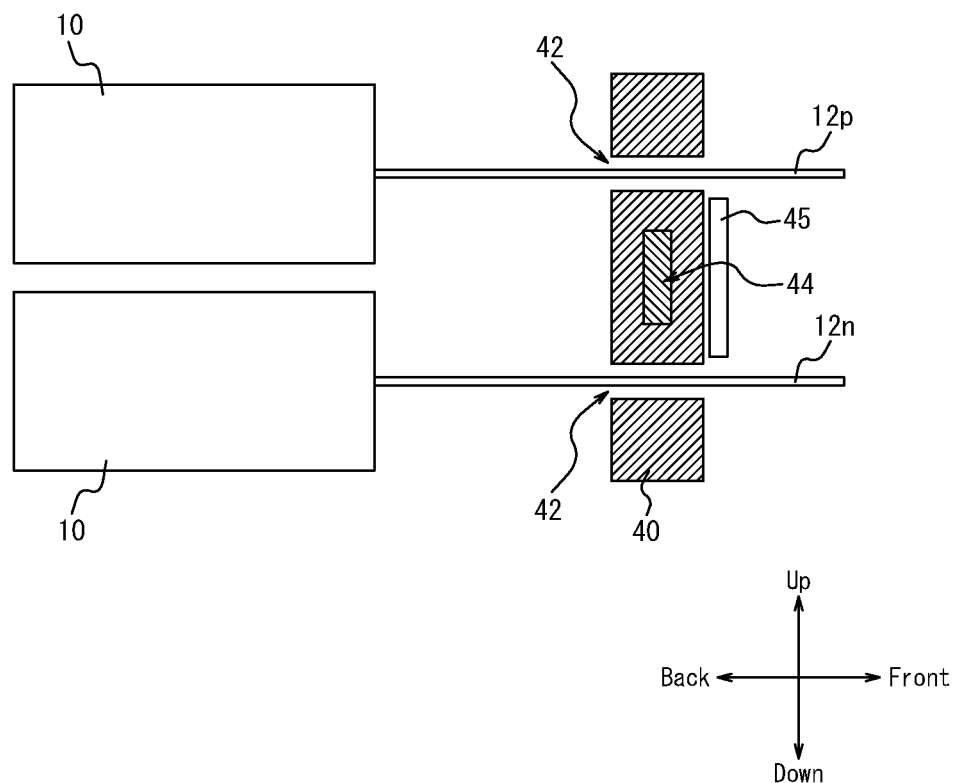
FIG. 18 illustrates an example with a metal plate, formed by insert molding, between slits of the case of the battery pack according to the second embodiment of the present disclosure.

As in the first embodiment, a metal plate 44 may be formed by insertion molding near the slits 42 (between slits 42) on the outer wall of the first case 40 in the second embodiment. The metal plate 44 is formed by insertion molding inside the outer wall that faces the folded and overlapping portion of the electrode tabs 12p and 12n, as illustrated in FIG. 18. If the laser penetrates the electrode tabs at the time of welding, this configuration can receive the laser with the metal plate 44 to protect the battery cells 10. A metal plate may also be formed by insertion molding near the slits 52 (between slits 52) on the outer wall of the second case 50.

Figure 19:
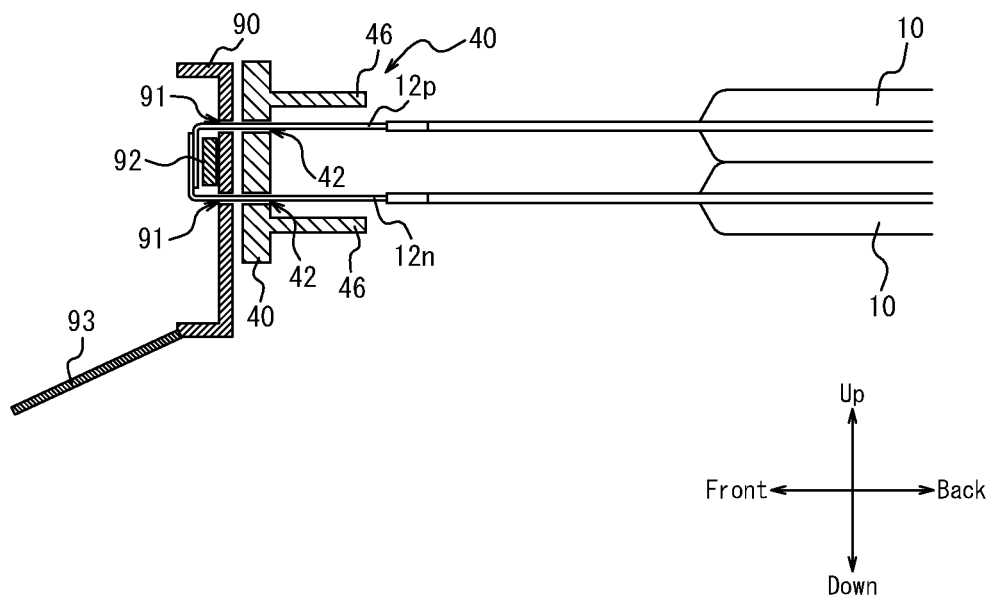
FIG. 19 is a schematic diagram illustrating an example of a bus bar module, that includes a tab connecting bus bar, attached to the case.

Instead of the tab connecting bus bar being provided in the first case 40 or the second case 50, the second embodiment may be structured so that a bus bar module 90 provided with a tab connecting bus bar is abutted against and attached to the outer walls of the first case 40 and the second case 50. FIG. 19 schematically illustrates an example of the bus bar module 90. The bus bar module 90 includes slits 91 that pass through the bus bar module 90 at positions corresponding to the slits 42 of the first case 40. The slits 91 are substantially rectangular, extend in the left-right direction, and are formed to allow the electrode tabs 12p and 12n of the battery cell 10 to protrude through the slits 91. The bus bar module 90 includes a tab connecting bus bar 92 between the slits 91. As illustrated in FIG. 19, the electrode tab 12p or 12n protrudes from each slit 91 and is bent so that the electrode tabs of adjacent battery cells 10 are folded and overlap each other. Specifically, the electrode tab 12p protrudes from the slit 91, bends downwards at approximately 90 degrees, and abuts against the electrode tab 12n of the downwardly adjacent battery cell 10 near the slit 91. The electrode tab 12p further abuts against the tab connecting bus bar 92. The electrode tab 12n protrudes from the slit 91, bends upwards at approximately 90 degrees, and abuts against the electrode tab 12p of the upwardly adjacent battery cell 10 near the slit 91. The laser for welding is irradiated onto the abutting portion, and the electrode tabs 12p, 12n and the tab connecting bus bar 92 are welded together. The bus bar module 90 may further include an insulating cover 93. The insulating cover 93 is, for example, attached to the lower portion of the bus bar module 90 to be openable, as illustrated in FIG. 19. After the electrode tabs 12p and 12n are welded, the welded portion is covered by the insulating cover 93. This configuration can secure insulation of the welded portion and improve the reliability of the battery pack. The bus bar module 90 is attached to the first case 40 in FIG. 19, but the bus bar module 90 may similarly be attached to the second case 50.

Figure 20:
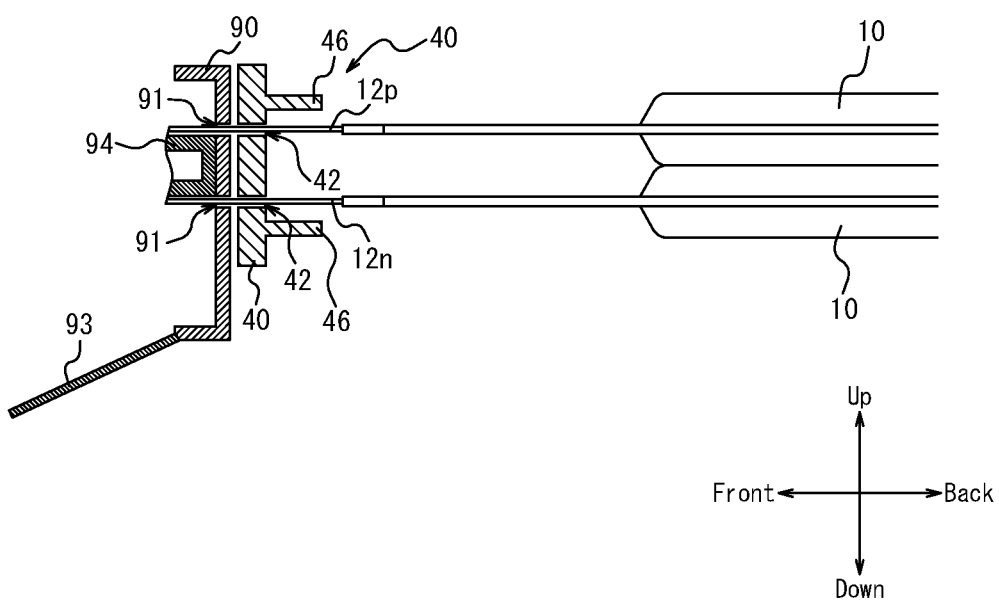
FIG. 20 is a schematic diagram illustrating another example of a bus bar module, that includes a tab connecting bus bar, attached to the case.

The shape of the tab connecting bus bar included in the bus bar module 90 may be changed. FIG. 20 illustrates an example of using a tab connecting bus bar 94 that has a substantially C-shaped cross-section. Use of the tab connecting bus bar 94 allows the electrode tab 12p or 12n protruding from each slit 91 to abut against the tab connecting bus bar 94 without bending. The laser for welding is irradiated onto the abutting portion to weld the electrode tab 12p and the tab connecting bus bar 94 together, or to weld the electrode tab 12n and the tab connecting bus bar 94 together.

It will be apparent to a person of ordinary skill in the art that the present disclosure can be embodied in forms other than the above embodiment without departing from the spirit or essential features of the present disclosure. Accordingly, the description above is only a non-limiting example. The scope of the present disclosure is defined not by the description above, but by the appended claims. Among all possible modifications, the modifications within the range of equivalents are to be considered encompassed by the claims.

A restraining plate 30 may also be provided along with the opening O at the lower surface side of the battery cell assembly 100 in the battery pack 1. The battery cell assembly 100 is thereby sandwiched from both above and below by rigid restraining plates 30, further improving the pressure retention.

Similarly, an insulating sheet 20 may also be provided at the lower surface side of the battery cell assembly 100 in the battery pack 1. The electrical insulation in the battery pack 1 can thereby be further improved.

The number of battery cells 10 and the number of windows 71 and 701 are not limited to the above configurations. Any number of battery cells 10 may be included. The windows 71 and 701 may be provided in an appropriate form corresponding to the number of battery cells 10.

REFERENCE SIGNS LIST

1 Battery pack
10, 10a, 10b, 10c, 10d, 10e, 10f Battery cell
11 Outer surface
12p, 12n Electrode tab
13 Outer surface
14 Exterior member
15 Resin layer
20 Insulating sheet
30 Restraining plate
31 Hole
32 Recess
40 First case
40a Bottom surface
41 Screw hole
42, 42a, 42b, 42c, 42d Slit
43 Recess
44 Metal plate
45 Tab connecting bus bar
46a, 46b, 46c Insulating portion
47, 47a, 47b, 47c, 47d Housing portion
50 Second case
51 Screw hole
52, 52a, 52b, 52c Slit
53 Recess
55, 55a, 55b, 55c Tab connecting bus bar
56 Fitting portion
57, 57a, 57b, 57c Housing portion
58 Protrusion
60a Total plus bus bar
60b Total minus bus bar
70 Jig (pressing member)
71, 71a, 71b, 71c, 701, 701a, 701b, 701c Window
72, 702 Insulating cover (window housing portion)
703 Recess 704, 705 Guide
706 Engaging hole
700 Pressing member
710 Fixing member
80 Body
80a Bottom surface
81 Support
81a Screw hole
90 Bus bar module
91 Slit
92, 94 Tab connecting bus bar
93 Insulating cover
100 Battery cell assembly
F Fixing portion
O Opening
S1 Connection surface

The invention claimed is:

1. A method of manufacturing a battery pack comprising a plurality of battery cells that have electrode tabs protruding from an outer surface, the method comprising:
   stacking the plurality of battery cells and housing the plurality of battery cells in a case so that the electrode tabs protrude from slits in the case;
   bending the electrode tabs protruding from the slits so that electrode tabs of adjacent battery cells are folded and overlap each other; and
   welding a folded and overlapping portion of the electrode tabs,
   wherein the bending of the electrode tabs comprises bending the electrode tabs protruding from the slits towards a recess provided in an outer wall of the case near the slits,
   wherein housing the battery cells in the case comprises abutting a tab connecting bus bar comprising slits against an outer wall of the case and then causing the electrode tabs to protrude from the slits of the case and the slits of the tab connecting bus bar, and
   wherein the welding of the folded and overlapping portion of the electrode tabs comprises welding the electrode tabs and the tab connecting bus bar together.

2. The method of manufacturing a battery pack of claim 1,
   wherein a metal member is disposed between the slits of the case; and
   the welding of the folded and overlapping portion of the electrode tabs comprises irradiating a laser on the folded and overlapping portion of the electrode tabs towards a position corresponding to the metal member.

3. The method of manufacturing a battery pack of claim 1, wherein the bending of the electrode tabs comprises using a pressing member to abut the electrode tabs protruding from the slits against the outer wall of the case.

4. The method of manufacturing a battery pack of claim 1, further comprising:
   providing a tab connecting bus bar on an outer wall of the case between the slits;
   wherein the bending of the electrode tabs is performed after the providing of the tab connecting bus bar; and
   wherein the welding of the folded and overlapping portion of the electrode tabs comprises welding the electrode tabs protruding from the slits and the tab connecting bus bar together.

5. The method of manufacturing a battery pack of claim 1, wherein the recess varies in depth.

6. The method of manufacturing a battery pack of claim 5, wherein the recess includes a triangular cross-sectional shape.

7. A method of manufacturing a battery pack comprising a plurality of battery cells that have electrode tabs protruding from an outer surface, the method comprising:
   stacking the plurality of battery cells and housing the plurality of battery cells in a case so that the electrode tabs protrude from slits in the case;
   bending the electrode tabs protruding from the slits so that electrode tabs of adjacent battery cells are folded and overlap each other; and
   welding a folded and overlapping portion of the electrode tabs, wherein:
   the bending of the electrode tabs comprises pressing the electrode tabs protruding from the slits against an outer wall of the case using a pressing member;
   the pressing member comprises a window at a position facing the folded and overlapping portion of the electrode tabs;
   the welding of the folded and overlapping portion of the electrode tabs comprises irradiating a laser through the window; and
   the welding of the folded and overlapping portion of the electrode tabs comprises using a fixing member to fix the pressing member to the case.

8. The method of manufacturing a battery pack of claim 7, further comprising attaching a window housing portion configured to cover the window after the welding of the folded and overlapping portion of the electrode tabs.

9. The method of manufacturing a battery pack of claim 7, wherein the pressing member includes guides for the electrode tabs to facilitate bending and folding thereof.

10. The method of manufacturing a battery pack of claim 9, wherein the guides are configured to bend a first electrode tab further inward than a second electrode tab.

11. A battery pack comprising:
   a plurality of battery cells having electrode tabs protruding from an outer surface;
   a case housing the plurality of battery cells in a stacked state,
   the case comprising a plurality of slits through which the electrode tabs protrude; and
   a tab connecting bus bar comprising another plurality of slits, the tab connecting bus bar abutted against an outer wall of the case such that the electrode tabs also protrude through the other plurality of slits,
   wherein the electrode tabs of adjacent battery cells are bent so that portions protruding from the slits are folded and overlap each other;
   wherein a folded and overlapping portion of the electrode tabs is welded outside the case to the tab connecting bus bar; and
   wherein a recess is formed in an outer wall of the case near the slits at a position corresponding to the folded and overlapping portion of the electrode tabs.

12. The battery pack of claim 11, wherein a metal member is inserted into an outer wall of the case at a position that is between the slits and corresponds to a welded portion of the electrode tabs.

13. The battery pack of claim 11, wherein the recess varies in depth.

* * * * *